(12) United States Patent
Wittkowski

(10) Patent No.: US 7,664,616 B2
(45) Date of Patent: *Feb. 16, 2010

(54) STATISTICAL METHODS FOR HIERARCHICAL MULTIVARIATE ORDINAL DATA WHICH ARE USED FOR DATA BASE DRIVEN DECISION SUPPORT

(75) Inventor: Knut M. Wittkowski, New York, NY (US)

(73) Assignee: Rockefeller University, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/706,751

(22) Filed: Feb. 14, 2007

(65) Prior Publication Data

US 2007/0208545 A1 Sep. 6, 2007

Related U.S. Application Data

(60) Provisional application No. 60/774,494, filed on Feb. 16, 2006.

(51) Int. Cl.
*G06F 17/18* (2006.01)

(52) U.S. Cl. .................. 702/179; 128/923; 702/181
(58) Field of Classification Search ............ 702/19–20, 702/30–32, 129–181; 706/47, 20, 21; 705/10; 707/5; 128/923, 924
See application file for complete search history.

(56) References Cited

U.S. PATENT DOCUMENTS

| 7,072,794 | B2* | 7/2006 | Wittkowski | 702/179 |
| 7,130,836 | B2* | 10/2006 | Grosser et al. | 706/47 |
| 7,395,185 | B2* | 7/2008 | Wittkowski | 702/179 |
| 2005/0086010 | A1* | 4/2005 | Rao et al. | 702/20 |

* cited by examiner

*Primary Examiner*—John H Le
(74) *Attorney, Agent, or Firm*—Foley & Lardner LLP

(57) ABSTRACT

A method of analysis including an intrinsically valid class of statistical methods for dealing with multivariate ordinal data. A decision support system that can (1) provide automated decision support in a transparent fashion (2) optionally be controlled by a decision maker, (3) provide for an evidence acquisition concept, including automatically increasing the content of an underlying database, and (4) provide a computationally efficient interactive distributed environment. The method is exemplified in the context of assisted diagnostic support.

13 Claims, 23 Drawing Sheets

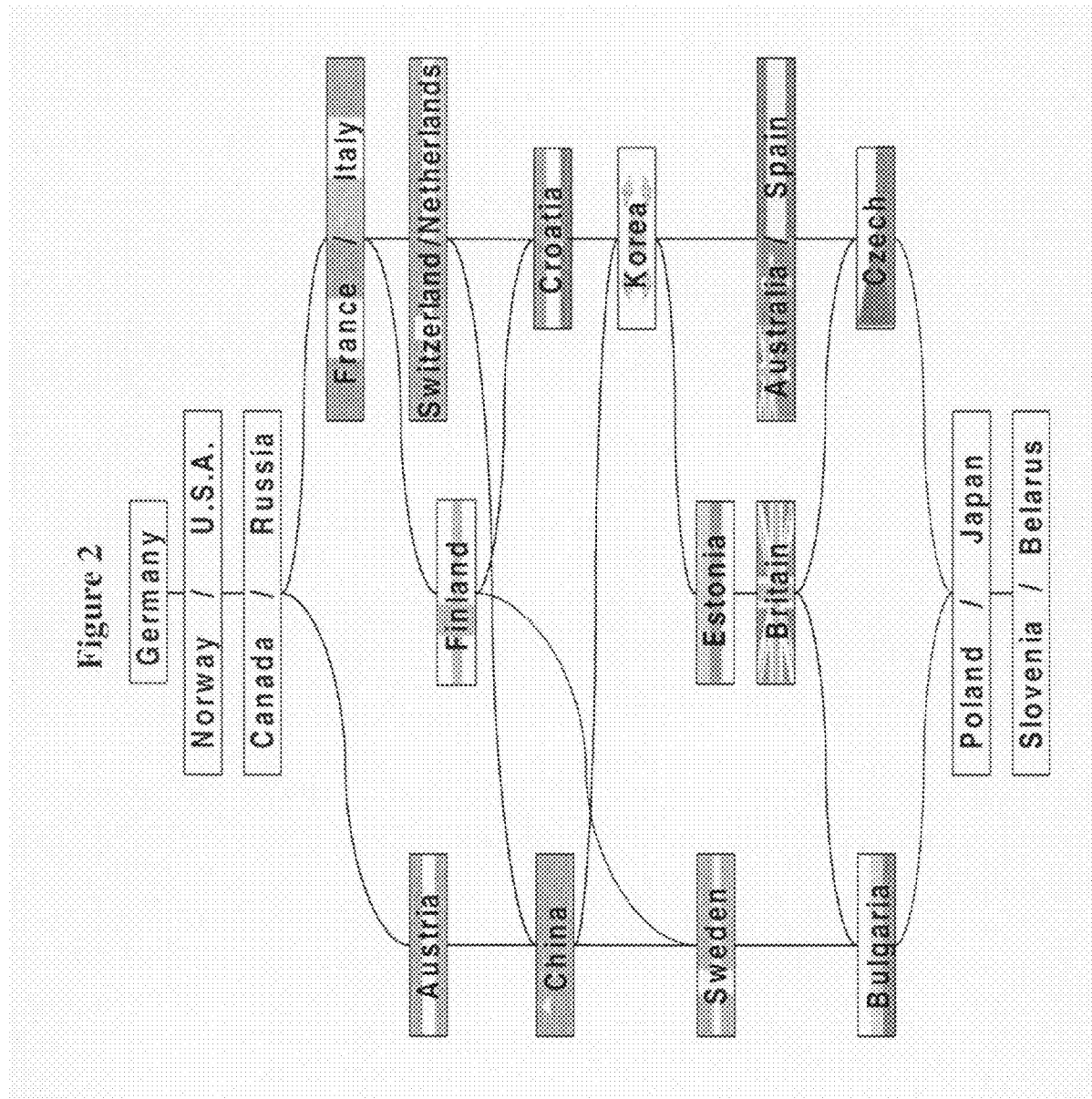

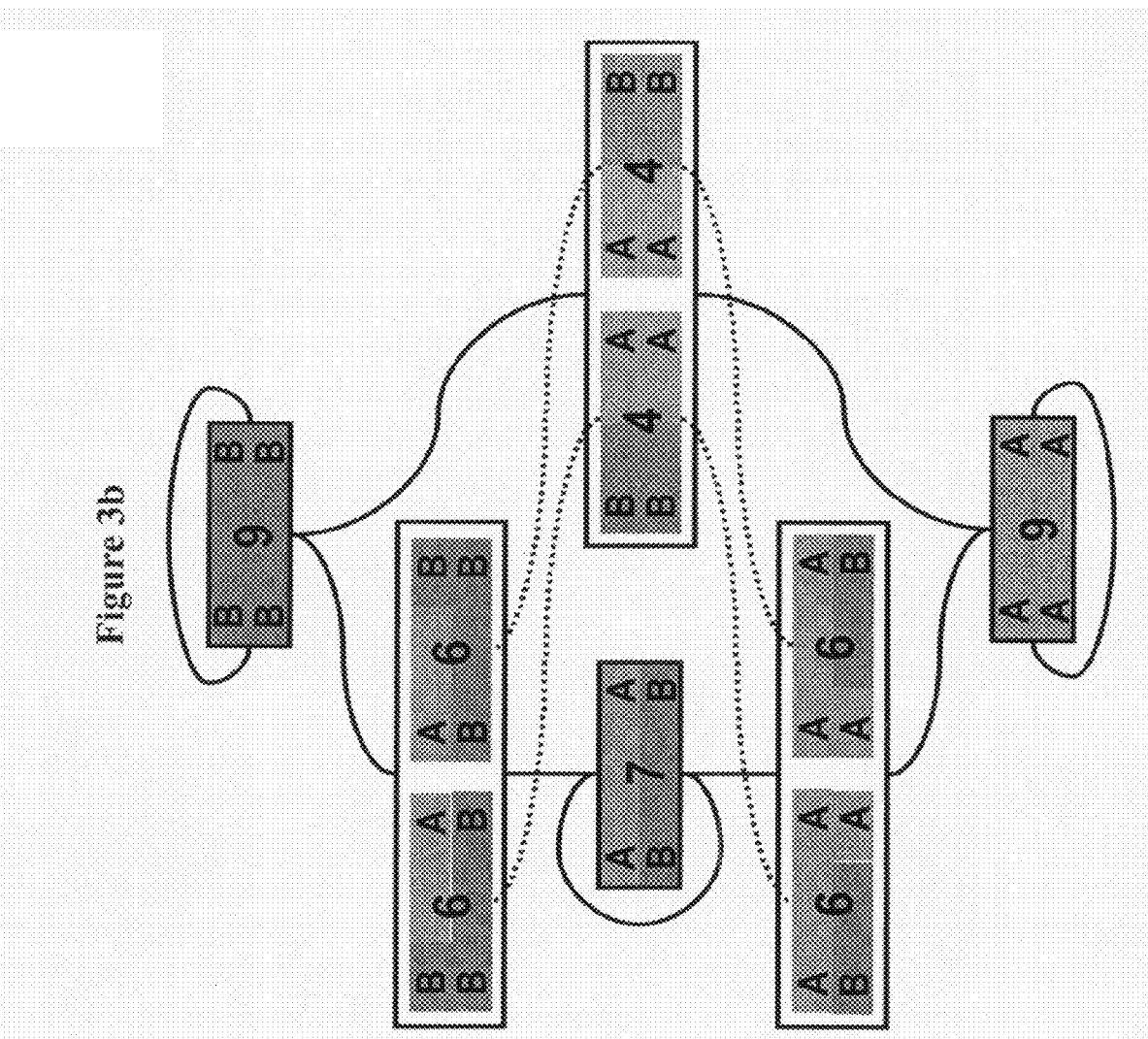
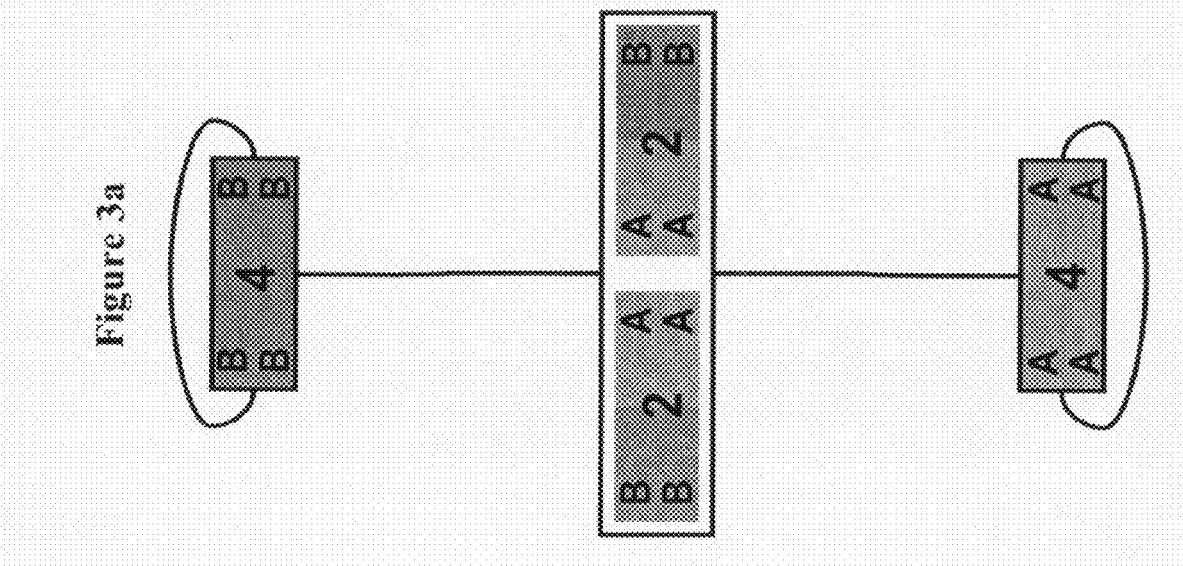

| G | ID | AD | AL | BD | BL |
|---|---|---|---|---|---|
| 1 | 4 | -0.14 | -21.12 | 0.44 | 19.86 |
| 1 | 24 | -0.17 | -7.71 | 0.24 | 11.28 |
| 1 | 44 | -0.32 | -2.78 | 2.01 | 1.66 |
| 0 | 26 | -0.01 | -37.36 | 0.07 | 6.34 |
| 0 | 7 | -0.12 | -25.95 | -0.10 | -3.63 |
| 0 | 22 | 0.00 | -4.53 | 0.24 | 11.15 |
| 0 | 1 | -0.47 | -21.25 | -0.37 | -6.34 |
| 0 | 29 | -0.57 | -5.00 | -0.39 | -5.55 |
| 1 | 2 | -0.06 | -5.57 | -0.06 | -7.05 |
| 1 | 11 | 0.28 | 2.70 | 0.45 | 2.60 |
| 1 | 19 | 0.08 | 3.58 | 0.03 | 5.70 |
| 0 | 27 | -0.01 | -4.93 | -0.37 | -3.70 |
| 1 | 8 | 0.28 | 1.66 | -0.10 | -1.64 |
| 1 | 15 | -0.46 | -85.00 | -0.52 | -17.50 |
| 0 | 5 | -0.16 | -4.86 | -0.27 | -6.86 |
| 1 | 12 | -0.24 | -3.18 | -0.14 | -7.05 |
| 0 | 13 | 0.30 | 4.42 | 0.52 | 10.57 |
| 1 | 40 | -0.07 | -5.31 | -0.63 | -5.40 |
| 0 | 43 | 0.08 | 2.79 | -0.06 | -4.41 |
| 0 | 6 | 0.07 | 2.41 | -2.78 | -3.23 |
| 1 | 38 | 0.10 | 4.05 | -0.02 | -5.21 |
| 1 | 32 | 0.02 | 3.70 | -0.02 | -7.87 |
| 0 | 9 | 0.25 | 3.04 | -0.17 | -5.97 |
| 1 | 39 | 0.08 | 6.67 | -0.16 | -6.23 |
| 0 | 20 | 0.21 | 4.20 | -0.85 | -3.76 |
| 0 | 10 | 0.10 | 6.18 | -1.30 | -4.23 |
| 1 | 28 | 0.25 | 3.82 | -0.53 | -4.41 |
| 0 | 45 | 1.02 | 2.48 | -1.60 | -4.23 |
| 1 | 14 | 0.24 | 8.72 | -0.29 | -5.58 |
| 0 | 35 | 0.20 | 5.76 | -0.35 | -9.49 |
| 0 | 25 | 0.12 | 21.25 | -0.13 | -9.58 |
| 0 | 10 | 0.26 | 12.59 | -0.49 | -4.38 |

Pairwise Orderings:

Information Content: #<> = 129

Asympt. Results:
X² = 3.171
p = 0.0750
(2-sided)

Froogle Product Search
- word = notebook
- word = tablet
- GHz > 1
- GB > 80
- MB > 1000
- product rating > 3
- miles (10021) < 5
- $ <<

Menu | Back

Figure 18b jStat Product Search
- word = notebook
- word = tablet
- GHz >> 0.5
- GB >> 40
- MB >> 500
- product rating >> 3
- miles (10021) < 5
- $ <<

Menu | Back

Figure 18c jStat Product Search
- word = notebook
- word = tablet
- GHz >> 0.5
- GB >> 40
- MB >> 500
- product rating >> 3
- miles (10021) < 5
- $ <<

Menu | Back

Figure 19

Figure 21

STATISTICAL METHODS FOR HIERARCHICAL MULTIVARIATE ORDINAL DATA WHICH ARE USED FOR DATA BASE DRIVEN DECISION SUPPORT

CROSS-REFERENCE TO RELATED PATENT APPLICATIONS

This application claims the benefit under 35 USC 119(e) of U.S. application Ser. No. 60/774,494, filed Feb. 16, 2006, incorporated herein by reference in its entirety.

FIELD OF INVENTION

The invention is generally concerned with a statistical method for dealing with inexact ordinal data consisting of one or more variables and a concept for a class of decision support environments, some of them interactive, made possible by the statistical method.

BACKGROUND OF THE INVENTION

The first statistical methods for ordinal univariate data were developed between 1935 and 1955 and have subsequently been extended to cover special cases of multivariate data, including, but not limited to, interval and approximate data. Some of these methods were based on conventional u-statistics and also the well known Marginal Likelihood (MrgL) principle.

The first results had a limited range of applications and were rarely used, due to deficiencies in the theory and lack of computationally efficient algorithms. An earlier application 20030182281 ('Statistical Methods For Multivariate Ordinal Data Which Are Used For Data Base Driven Decision Support'), which is incorporated herein by reference, provided for a method that allowed for more efficient algorithms, yet the method did not cover an important aspect, namely how to incorporate knowledge about relationships between variables or subsets of variables.

This application extends the earlier application 20030182281 by providing a method to construct partial orderings that a decision maker can use when the variables are structured hierarchically, i.e., if variables can be grouped into subsets of variables, the variables in each subset known to be related to a common feature of the latent factor. The proposed application allows for recursive subdivisions, i.e., each of subsets can then be subdivided into subsets itself.

Shortcomings of Currently Available Statistical Methods When Used with Ordinal Data Most statistical analysis programs are based on the linear model, not because the assumption of linearity is realistic, but mainly because it leads to computational simplicity. When applied to multivariate data, it comprises the use of linear combinations (i.e., weighted averages) of the variables (e.g., 10 times expression of gene A plus 2 times expression of gene B minus the logarithm of the expression of gene C). With biological, psychological, and genomic applications the relationship between the measurement (body temperature, IQ, gene expression) and its meaning (fever, social status, immunity), however, are rarely linear, but usually merely ordinal. An increase in body temperature (observed variable) by 2° C. from 35° C. to 37° C., for instance, is usually irrelevant with respect to fever (latent factor), while an increase by the same amount of 2° C. from 41° C. to 43° C. is lethal. Thus, body temperature as an indicator of fever is 'ordinal', i.e., the sign (direction) of the difference is important, yet the magnitude has no consistent meaning. In such situations, i.e., when a linear combination may not be meaningful, even after some transformations, the use of linear models is questionable at best.

A different class of approaches comprises the use of models for categorical data, where data are interpreted on a 'nominal' scale, i.e., where any order between categories is assumed irrelevant. Non-limiting examples are colors, races, but also disease codes. For these models to be applicable, however, continuous variables need to be discretized, which typically introduces arbitrariness and leads to loss of information on the order of the categories, which is clearly undesirable in many applications.

The need for methods capable of handling multivariate monotonic data has been widely acknowledged (see, for instance, US Patent Application 20060149710), yet the lack of practical methods for dealing with ordinal data has led to linear model methods being applied to ordinal data. External 'validation' is then used to justify a conceptually invalid approach. For such 'validation' to be at least a reasonably good approximation, however, one needs an independent set of entities where the latent factor is known (often called a 'gold standard'), against which the various linear score functions can be compared. Aside from being conceptionally questionable, external validation, poses several technical problems. While methods based on the linear model are relatively simple for a given transformation, the evaluation of many possible 'linearizing' transformations is computationally challenging. Moreover, collecting data from entities with similar characteristics and known conditions may prove time consuming. If the population considered is relatively 'unique', similar entities can be difficult to find.

Methods for multivariate ordinal data, ideally should be somewhere between linear models for interval scaled data and categorical models for nominally scaled data. They should not assume a specific form of the relationship between each of the observed variables and the latent factor, but recognize the fact that 'more is better' (or worse, for that matter).

The MrgL approach was introduced about 1973 for use with censored ordinal data and has been applied to assess side effects, determine risk factors, evaluate prevention strategies, and measure immunogenicity. However, the MrgL approach may lead to methods of extreme computational complexity.

The methods of the earlier application 20030182281 generalized a related approach based on u-statistics to multivariate ordinal data. While the earlier application 20030182281 provided a method to measure information content, it did not resolve a common problem which causes loss of information content when u-scores for multivariate data are applied to situations involving many variables. u-scores rely on determining all pairwise orderings between objects. For univariate data, this ordering is 'complete', i.e., the order among any two objects (A, B) can be determined as either A<B, A=B, or A>B. For multivariate data this ordering may only be 'partial'. If one variable is higher in object A, and another variable is higher in object B, the order between the two objects is ambiguous (A~B). As any two discordant variables cause the ordering between two objects to be ambiguous, information content, i.e., the number of unambiguous orderings decreases as then number of variables increases.

The earlier application 20030182281 resolved this problem for two special cases where dimensionality can be reduced through amalgamation of some variables or through the use of specific multivariate partial orderings. Non-limiting examples of such amalgamating functions comprise of average, median, and test statistics. Non-limiting examples of specific orderings comprise those specifically designed for intervals (the special case considered by Gehan 1965), interchangeable variables, probe pairs on Affymetrix GeneChips, and diplotypes.

The current application provides for a more general method to ameliorate the loss of information content with increasing numbers of variables. It applies to all situations, where variables can be structured in a hierarchical fashion, thereby allowing a decision maker to obtain results from multivariate ordinal in situations where the method of the earlier application 20030182281 might suffer from or fail due to low information content.

The preferred method addresses this problem by providing a generic method that allows for some of the variables to be grouped in a hierarchical fashion. For instance, one may have collected information about several features of the latent (unobservable) factor. In clinical trials, such feastures might be safety (adverse effects) or efficacy (desired effects), When assessing quality of life, as another non-limiting example, one may have several variables for each of the following features: 'quality of sleeping', 'sexual desire', and 'job satisfaction' (first hierarchical level). One may then have measured each variable twice, the first time before and the second time after an intervention, aiming at assessing the magnitude of the intervention's effect (second level). Finally, one may have measured each variable at each time point repeatedly to reduce the effect of measurement errors (third level). In genomics, as yet another example, one may have observed changes in the expression of genes known to act along different genomic 'pathways' (where the genes acting along the same pathway comprise the first hierarchical level), each gene then is typically represented by several specific sequences of base pairs (which comprise the second hierarchical level), and each sequence is accompanied by a 'mismatch' to determine specificity (the pair comprising the third hierarchical level).

The gain of information by using a hierachical structure among the variables is illustrated in FIG. 7. In this non-limiting example, it is assumed that variables X1 and X2 are related to one feature of the latent factor, while variables Y1 and Y2 are related to another feature of the same latent factor.

Referring to FIG. 7 Hesse diagrams are used to illustrate which pair wise orderings can be decided. The first row of Hesse diagrams illustrates the univariate partial ordering for each of four variables. Pairs of observations whose order can be decided as being either '>', '<', or '=' are connected by lines, with horizontal lines indicating '='. For instance, Object B is larger than object A with respect to variable X1 (2>1), but of the same order as object A with respect to variable Y1 (3=3). For object C, the data for variable X1 is missing ('?') and, thus, subject C is not connected with any other subject in the Hesse diagram generated by variable X1.

The second row illustrates the corresponding Hesse diagrams for the case where the variables are grouped as (X1, X2) and (Y1,Y2), with the pairwise orderings being obtained using method described in the earlier application 20030182281.

The third row illustrates the difference between the non-hierarchical method described in the earlier application 20030182281 (left side) and the preferred hierarchical method (right side). If the hierarchical nature of the variables' relation to the latent factor were ignored, only three pairwise orderings could be decided: A>C, B>C, B>D, resulting in u-scores U'=(1, 2, −2, 1), depicted in the lower left diagram of FIG. 7. However, if the relation of the variables to the two features of the latent factor is accounted for, one obtains the additional pairwise ordering A>D, resulting in a more informative lattice (four vs. three pairwise orderings decided) yielding the u-scores U=(2, 2, −2, −2).

As a related, yet also inferior approach, the earlier application 20030182281 could be applied to score related variables first, using the method of the earlier application 20030182281 and then applying this method again, this time to the scores obtained in the first step, possibly using different partial orderings. Then this process of rescoring subsets of scores could be repeated until the data is reduced to a single score. Unfortunately, this approach does not necessarily provide the most informative scores. As can be seen in FIG. 7, subject D with $(U_{X+}, U_{Y+})=(-0.5, -1.5)$ (bottom of center row) would be considered larger ('>') than subject C with $(U_{X+}, U_{Y+})=(-1.5, -1.5)$, while the diagram provided in the lower right of FIG. 7 demonstrates that the hierarchical order between subjects C and D is undetermined.

With the non-hierarchical method of the earlier application 20030182281, an ambiguous order between two subjects (A~B) in any group of related variables results in the pairwise order between the two subjects being declared 'ambiguous', even if subject A is superior to subject B in all other groups. The preferred approach allows for groups of variables to be defined in a hierarchical fashion, in a way that some of the ambiguities that would be created with the method of the earlier application 20030182281 could be resolved. As the preferred approach operates on intermediate lattices (which could be depicted as Hesse diagrams), rather than intermediate scores, it does not ignore ambiguities as would merely applying the method of the earlier application 20030182281 in a hierarchical fashion.

Shortcomings of Currently Used Decision Process When Applied to Multivariate Ordinal Data Situations where categories need to be ranked with respect to their exigency based on multivariate results in a test entity are frequent. One non-limiting example is the decision of a diagnosis in a patient. Traditionally, such decisions are based on comparing the patient's value in each variable individually against a published 'normal range' derived from a 'standard' population of 'controls' (healthy individuals). Frequently, these ranges are determined as the mean $(x.)\pm 2$ times the standard deviation (SD) of the empirical distribution among the controls. Depending on which observed variables exceed their normal ranges, the decision maker (the physician) determines that the entity (patient) belongs to a specific category (of disease) in which such observations are expected, often employing subjective criteria to pick one of several categories. There are several inherent problems:

(1) Characterizing empirical distributions by ranges $x.\pm 2\times SD$ is valid only if the theoretical distribution is Gaussian, an assumption which is inappropriate for the majority of variables in fields comprised of medicine, biology, genetics, and sociology.

(2) A single 'standard' reference interval is unlikely to be optimal for all entities.

(3) Addressing specificity only, i.e., ignoring the distribution of a variable among the cases in either category (sensitivity) is not sufficient to even partly automate the decision process.

The above problems are even more relevant in dealing with multivariate data (each variable being point, interval, or distribution). Further:

(4) Looking at a single variable at a time is often not sufficient.

(5) The set of variables to be optimal to determine the relative position of the entity with respect to the reference populations may vary.

(6) As linear combinations cannot be meaningfully utilized to reduce multivariate ordinal data to univariate data, as within the linear model, specific problems exist that have not been addressed.

(7) To determine sensitivity and specificity for a cutoff target, it is not sufficient to compare the test entity with either population (controls and cases) separately, as in the linear model.

(8) Often some different subsets of variables are related to different features. In medicine, for instance, some variables may describe clinical efficacy, while others describe side effects or quality-of-life.

Shortcomings of Previously Proposed Decision Support Systems

The complexity of dealing with multivariate data has led to several generations of decision support systems (also known as knowledge based systems or expert systems). Of the first generation, developed in the 1960s, most remained only prototypes. Even the second generation, developed in the 1970s, has failed to gain widespread acceptance because they merely tried to mimic the human decision process, rather than striving at overcoming its shortcomings by utilizing advances in technology to go beyond the 'heuristic' nature of human decisions. With more information becoming available through 'information technology', the inherent problems of intuitive decision making are likely to become even more apparent. The advent of genetic, genomic, and proteomic information, has further complicated the situation by increasing the number of variables relevant to diagnostic decision-making. Simply increasing the computational capacity of conceptually insufficient 'expert systems', clearly, cannot overcome the underlying obstacles.

In previous 'expert systems', the separation of a general purpose 'inference engine' from an unstructured 'knowledge base' containing a vast set of 'heuristics' and applying it in an iterative fashion, resulted in a lack of transparency, that could not be overcome with yet a different component, an 'explanation facility'. Similar criticism regarding the obscure algorithms underlying Google's 'quality scores' has recently been expressed at the Search Engine Strategies 2006 conference. When decision makers cannot understand the decision process, they cannot not control it. The need to acquire knowledge as heuristical rules with subjective 'certainty factors' attached, not only contributed to non-transparent decisions, but also made the knowledge acquisition process difficult.

SUMMARY OF THE INVENTION

Statistical Method

An intrinsically valid statistical approach for the analysis of inexact ordinal data consisting of one or more variables is therefore provided, the most preferred approach comprising the steps of:

(1) partially ordering data by determining for all pairs of data the order of a first datum compared to a second datum as (i) superior, (ii) inferior, (iii) equal, or (iv) undecided, wherein for tupels a partial ordering comprises the first datum to be superior if for each variable the first datum is superior or equal, and for at least one, variable, the first datum is superior;

(2) factorizing the partially ordering data;

(3) generating a matrix of pairwise orderings score for each datum based on the partial ordering;

(4) combining matrices of pairwise orderings based on a hierarchical structure among the variables (5) computing a score from the combined matrix of pairwise orderings.

(6) estimating the information content for each of the scores with respect to the intended aggregation from the combined matrix of pairwise orderings;

(7) generating a weight for each score based on the information content; and (8) aggregating the scores and weights of all data by means of any conventional statistical method for weighted rank scores, wherein the statistical methods comprise methods for ranking, positioning, comparing, discriminating/regressing, and clustering.

The instant approach also provides that information content is estimated after differentiating pairs of data that represent conditions similar enough to be considered identical from those that are merely indistinguishable, the conditions that can be considered identical comprising exact ties and within group ties, and that partial orderings are factorized for data representing conditions that can be considered identical.

The approach further provides that the scores are generated using u-statistics, the steps comprising: (a) for an entity, counting the number of inferior entities and (b) subtracting the number of inferior entities.

Still further the most preferred approach provides that the information content is measured using u-statistics, the steps comprising (a) factorizing the partial ordering and (b) taking the square root of the ratio of the number of decidable pairs divided by the total number of pairs.

Still further, the instant approach provides for a strategy that allows for increasing information content by resolving some ambiguities regarding the order between subjects by providing that variables can be grouped in a hierarchical fashion, each group comprising variables related to a common feature, the strategy comprising of allowing for ambiguous pairwise orderings in one group of variables to be overwritten if the pairwise ordering in another group can be decided. The preferred approach provides a generic method, by which the need for defining problem specific pairwise orderings that include all variables can be avoided. Instead, the preferred approach provides a method, by which it suffices to declare a hierarchical ordering of the variables (a 'tree'), and then assign a pairwise ordering to each of the nodes.

Decision Process

The preferred approach provides further for a decision process wherein different variants of the above described intrinsically valid statistical approach are utilized at different stages and wherein a database of reference entities of known categories and a potentially large set of variables is utilized to provide a decision maker with an ordered list of categories to which the decision maker may assign the entity, (a) restricting a database of reference entities of known categories to an ad-hoc database based on a first hierarchically structured subset of variables, termed 'characteristics', (b) selecting a set of control categories based on a second subset of hierarchically structured variables, termed 'control indicators', (c) selecting a set of case categories based on a third subset of hierarchically structured variables, termed 'case indicators', (d) selecting a separate reference population subset for each of the case categories and at least one reference population for the union of the control categories, (e) selecting a set of hierarchically structured variables, termed 'discriminators', specific to a selected case category and the selected subset of characteristics, wherein the entity is positioned with respect to the joint population of cases and controls, (f) determining the entity's score relative to the control population, termed 'specificity', and the entity's score relative to the case population, termed 'sensitivity'; and, (g) assigning values to entity specific assessment variables, and (h) utilizing sensitivity and specificity as well as a hierarchically structured set of entity specific and entity independent assessment variables, the variables comprising consequences of correct and false decisions regarding the entity belonging to a particular category, to order the categories with respect to their overall benefit/risk profile.

The preferred process also provides for situations where a decision maker iteratively interacts with the database of data records from reference entities, where each record potentially has a large set of variables, the steps further comprising: (a) modifying the set and the hierarchical structure of the characteristics by which the ad-hoc database is selected, (b) modifying the set and the hierarchical structure of the indicators by which the categories are defined and the categories themselves, (c) modifying the set and the hierarchical structure of the discriminators by which the position of the entity relative to the reference populations is determined, and (d) modifying the set and the hierarchical structure of the assessment variables.

Further, the preferred process provides for a situation where the decision maker is assisted in modifying characteristics, indicators, categories, discriminators, and assessments.

SCOPE OF THE INVENTION

The preferred approach also provides a process comprising a method for assisted diagnosis of a patient. While the preferred embodiment specified herein is in the field of medicine (as are Example 2 and Example 3), the preferred approach is not restricted to applications in biology in general or to medical diagnoses in particular. The preferred approach is applicable to a wide range of problems, including, but not limited to, judging in student performance or sport events (see Example 1), advising on investments, forecasting thunderstorms, identifying deposits of minerals or oil, machine learning, facerecognition, detection of fraud or other criminal activities, early warning of terrorist activities or technical failures in complex systems, data mining to extract information from large data bases, and prioritizing results of Web search queries (see Example 4).

BRIEF DESCRIPTIONS OF DRAWINGS

FIG. 2 shows the lattice structure of countries by Salt Lake City medal profiles for the data as in FIG. 1 (see text for explanations).

FIG. 3a and FIG. 3b shows partial ordering of genetic evidence for the interval between a left marker L and a right marker R to contain a disease gene G. FIG. 3a shows inbred strains, FIG. 3b outbread strains. Numbers indicate the number of notes that are smaller, greater, or exactly tied. Nodes within boxes are comparable only with nodes connected with a dashed line or through the lines connecting the box, but not among each other.

Figure 4:
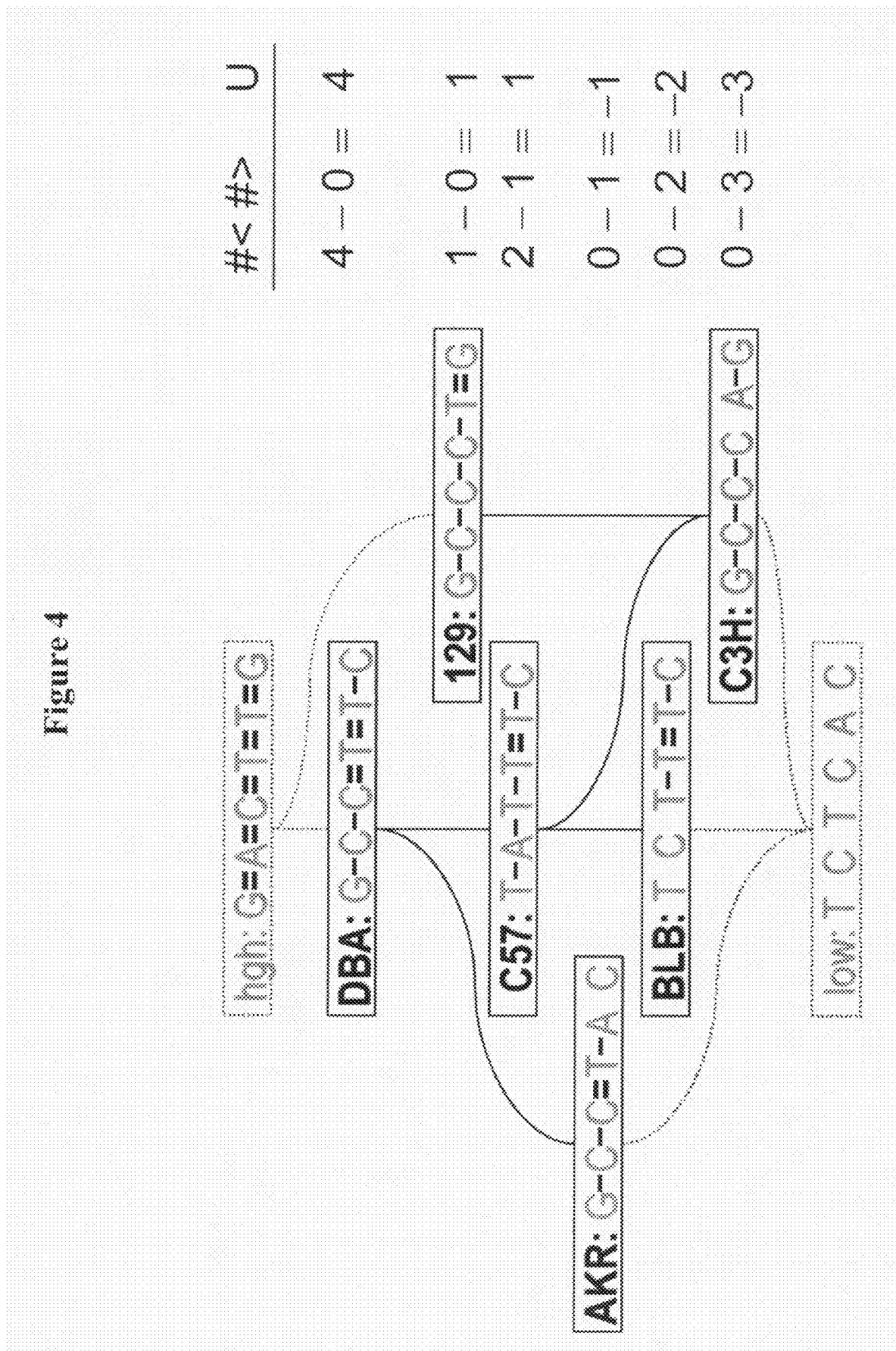

FIG. 4 shows a partial ordering of observed haplotypes between putative extremes (dotted) and computation of u statistics. The tupels are ordered by the profiles of strength of between marker evidence ('=': high, '−': intermediate, ' ': low).

Figure 5:
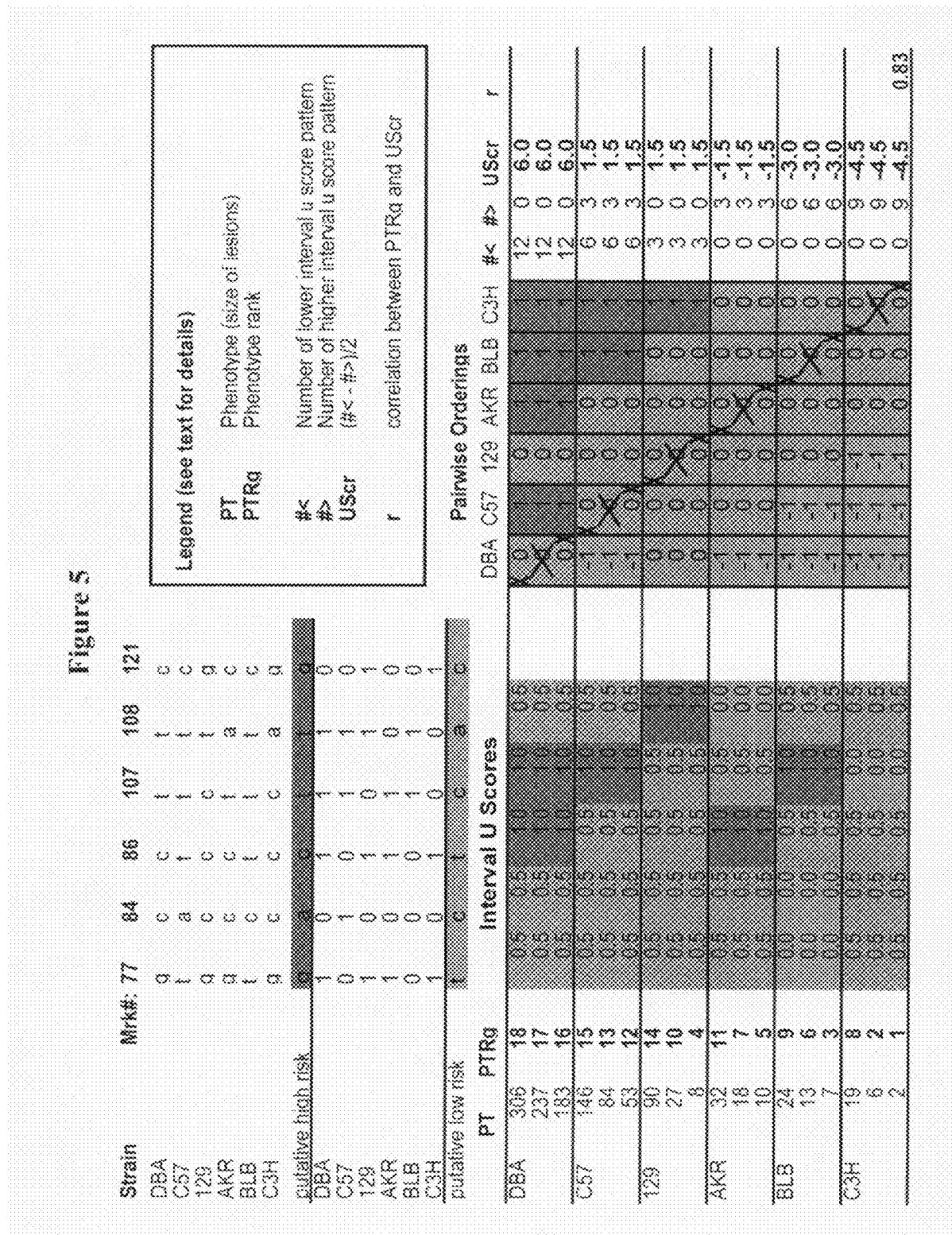

FIG. 5 shows a spreadsheet implementation of the computational procedure to derive diplotype u-scores (FIG. 4) from interval u-scores (FIG. 3) and to correlate the diplotype with the phenotype.

Figure 6:
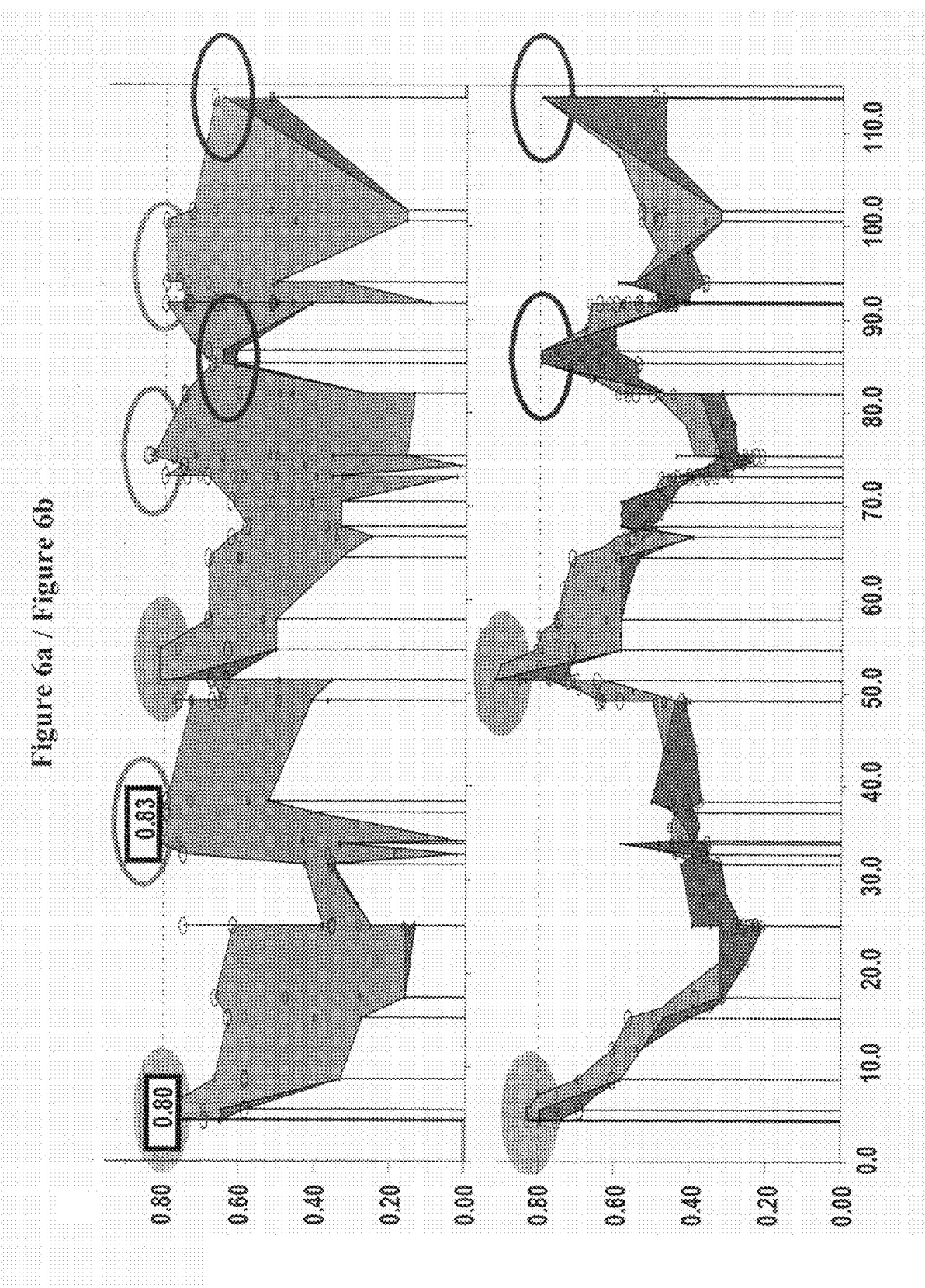

FIG. 6a and FIG. 6b compare directly in silico (FIG. 6a) vs. 'in silico' (FIG. 6b) correlation between phenotype and genotype scores on chromosome 1 for bins of 1-10 adjacent informative markers.

Figure 7:
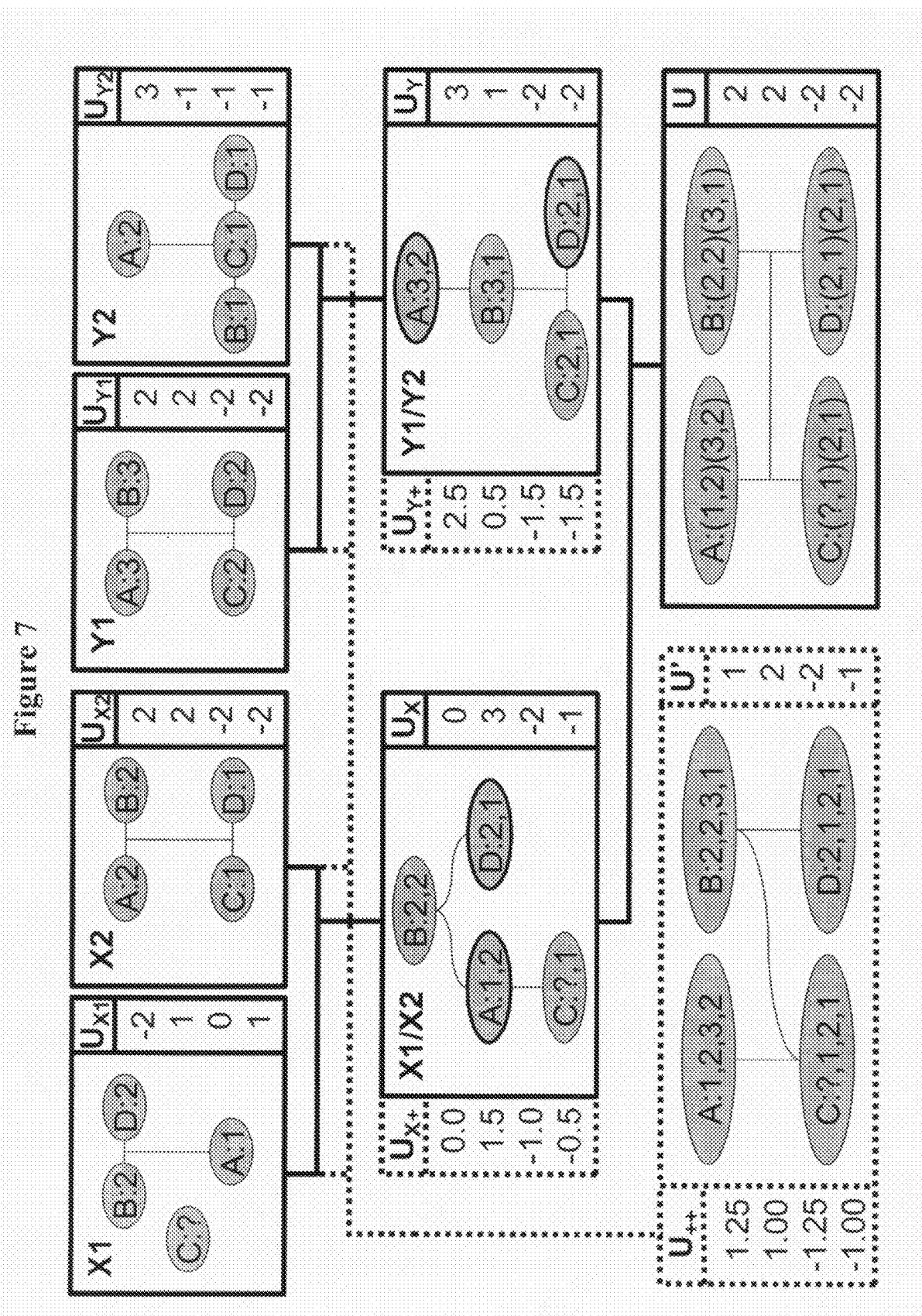

FIG. 7 illustrates the transformation of four observations with two groups of variables ((X1, X2), (Y1, Y2) ) into u-scores, (a) using the preferred hierarchical approach (connected by black lines, resulting in the score vector U), (b) as non-hierarchical 'one-step' u-scores (connected by dashed lines, resulting in the score vector U'), (c) as sums of higher-level u-scores (resulting in the score vectors $U_{X+}$, $U_{Y+}$, $U_{++}$).

Figure 8:
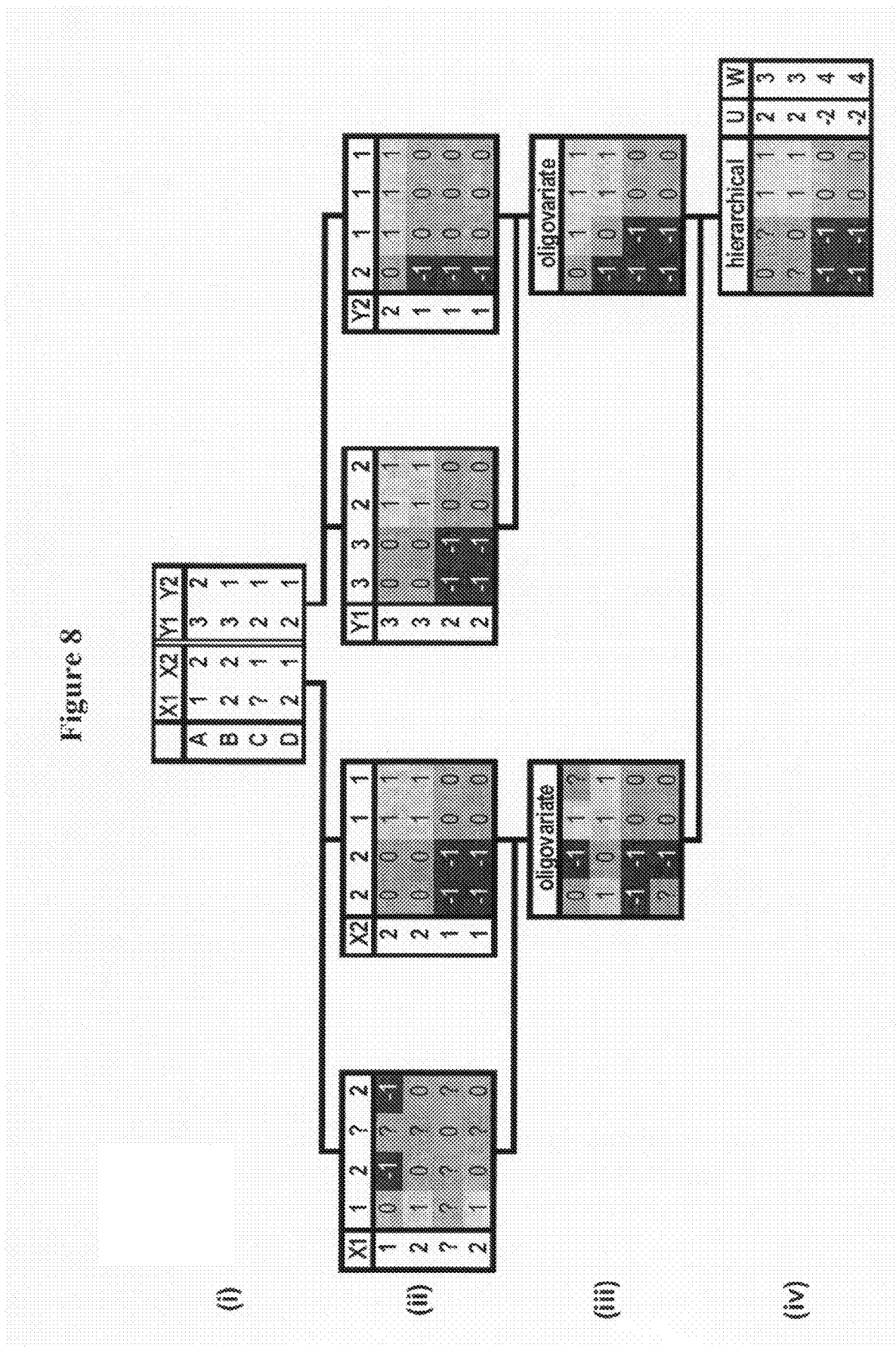

FIG. 8 Illustrates how the method of FIG. 7 can be represented using matrices, rather than Hesse diagrams yielding both u-scores and IC weights.

Figure 9A:
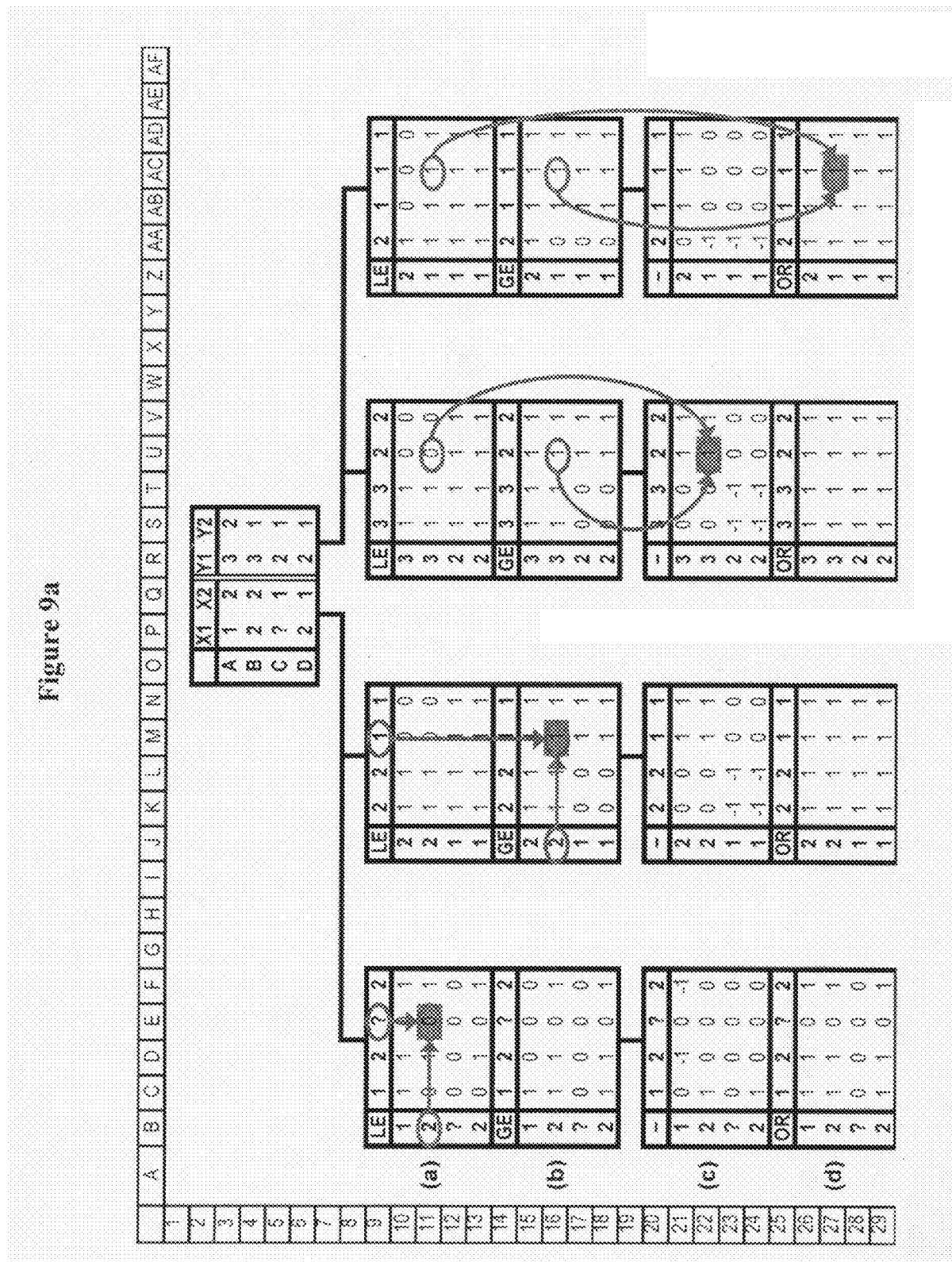

FIG. 9a illustrates how the method can be used to handle data in commercially available spreadsheet programs. Rows (a) (LE: row element<=column element) and (b) (GE: row element>=column element) illustrate an equivalent representation of the matrices in FIG. 8. There, the cells may contain values '1', '0', '−1', and '?', here the pairwise ordering is represented as two binary matrices. In rows (c) and (d), an equivalent representation is used, which is more suitable for the preferred method to be embodied in a commercially available spreadsheet. The code of yet another equivalent embodiment in as an R/S library suitable for larger data sets is given below at the end of the specifications.

Figure 9B:
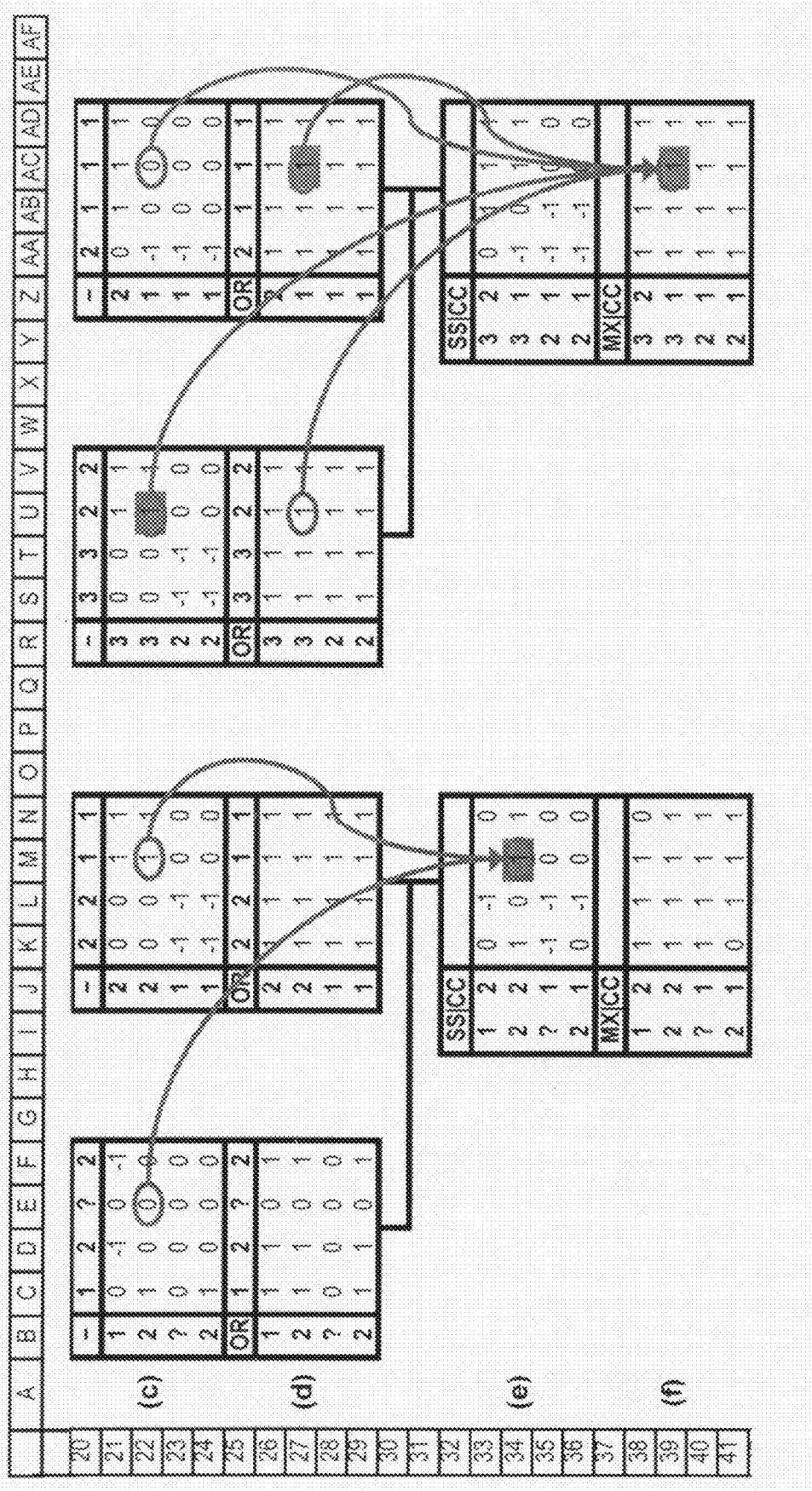

FIG. 9b illustrates how partial orderings are combined to obtain scores (left side, going from row c to row e) and information content measures (right side, going form from rows c and d to row f.

FIG. 9c then illustrates first, how the same step shown in FIG. 9b is now iteratively applied to the results from the previous step (rows e and f) to obtain the data in rows g and h. Clearly, this iterative step could be repeated as often as necessary. Finally, the intermediate results in rows g and h are used to obtain the final 'hierarchical' partial ordering, from which the scores U are computed, and to obtain the weights W (from row h)

Figure 10:
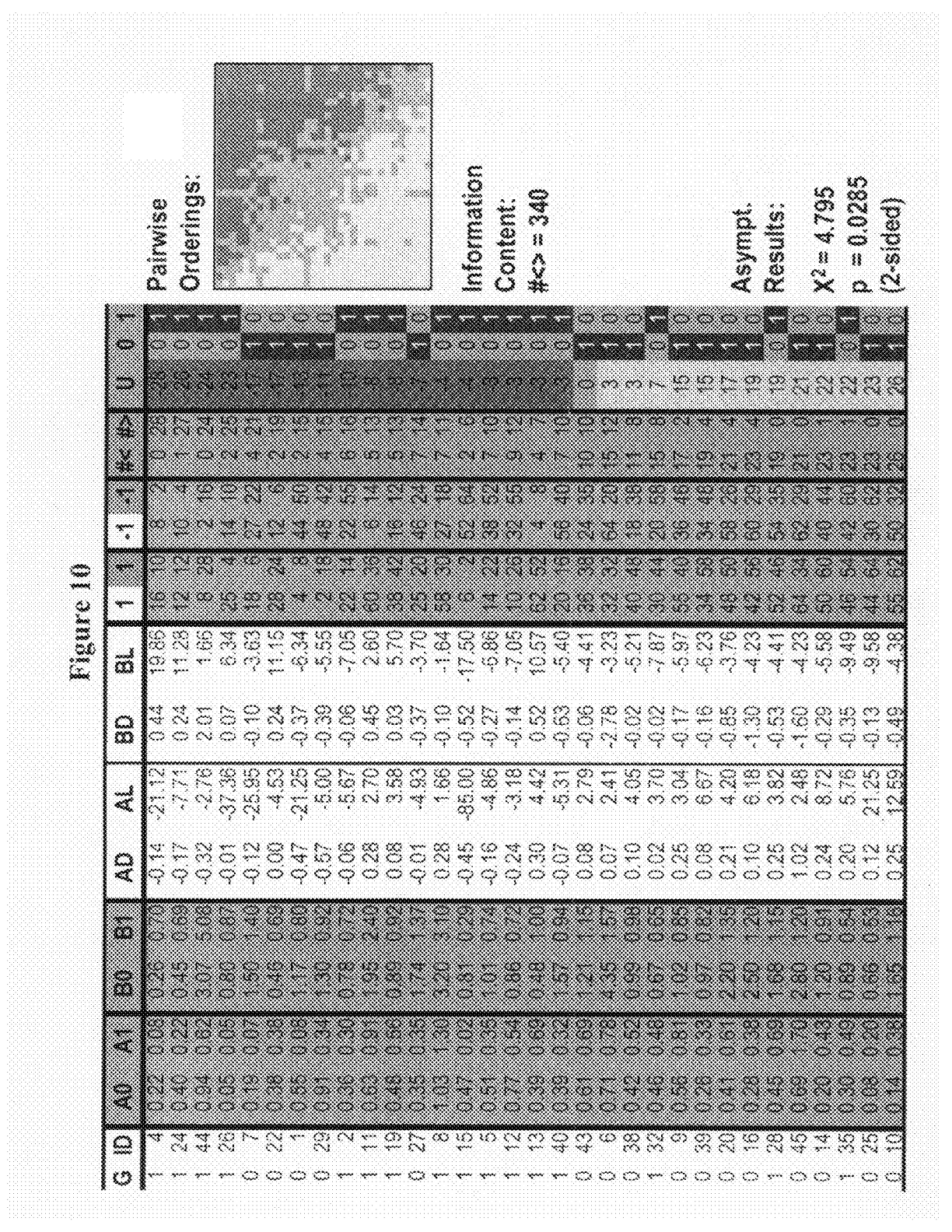

FIG. 10 illustrates the transformation from pairs of observations ((A0, A1), (B0, B1)) into derived variables ((AD=Diff (A0, A1), AL=Levl(A0, A1)), (BD=Diff(−B0,−B1), BL=Levl(−B0,−B1))) suitable for scoring by means of the standard method for a generic partial ordering. It also shows the matrix of pairwise orderings. In the example shown, the subjects have been sorted according to their u-scores. Based on 340 pairs of known order, the differences between the two groups (with hierarchical scoring) are significant at the 0.029 level.

Figure 11:
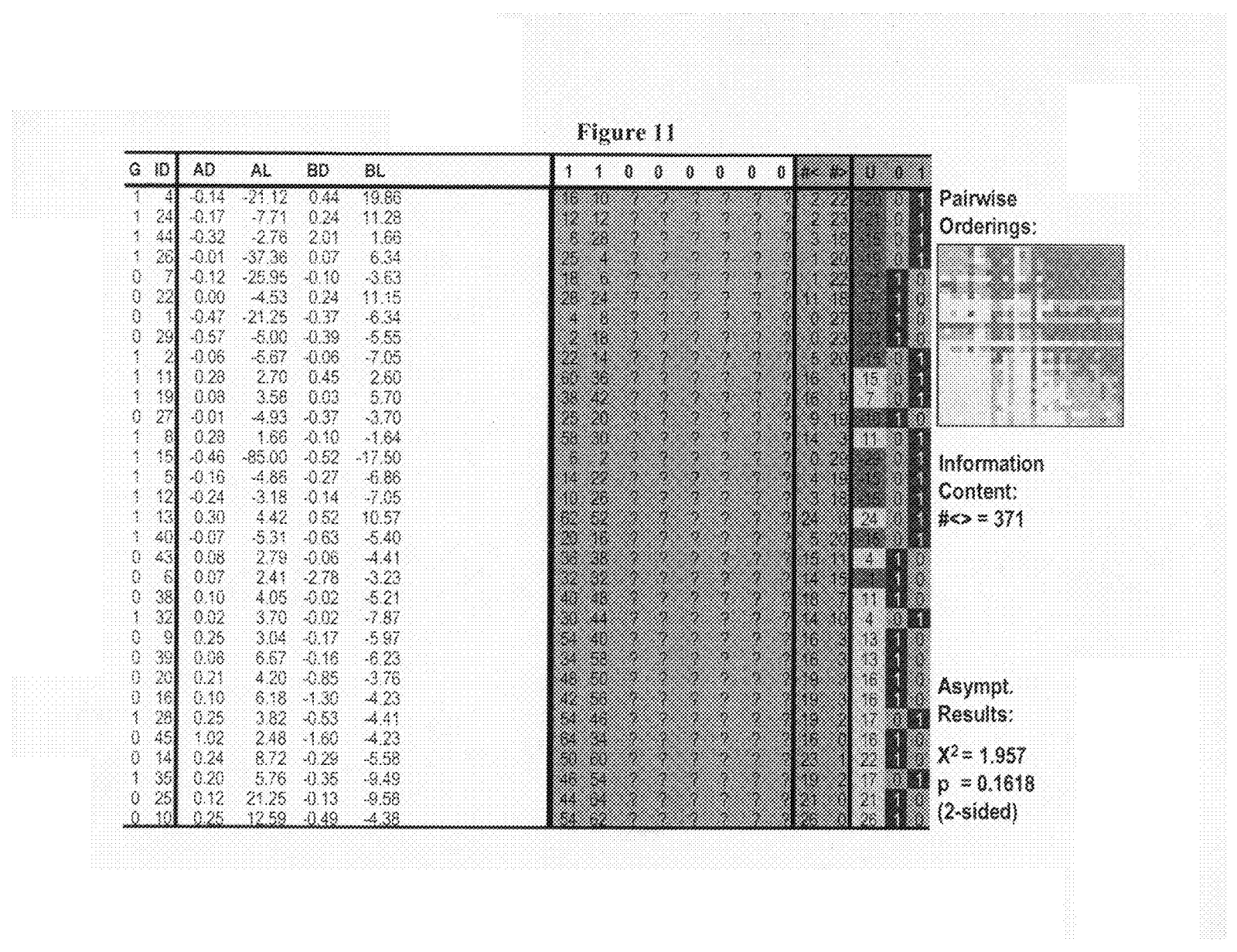

FIG. 11 illustrates the analysis of the data in FIG. 10 based on (AD, AL) alone. The subjects are sorted according to their u-scores in FIG. 10. Although 371 pairs have a known order, the results are significant only at the 0.162 level.

Figure 12:
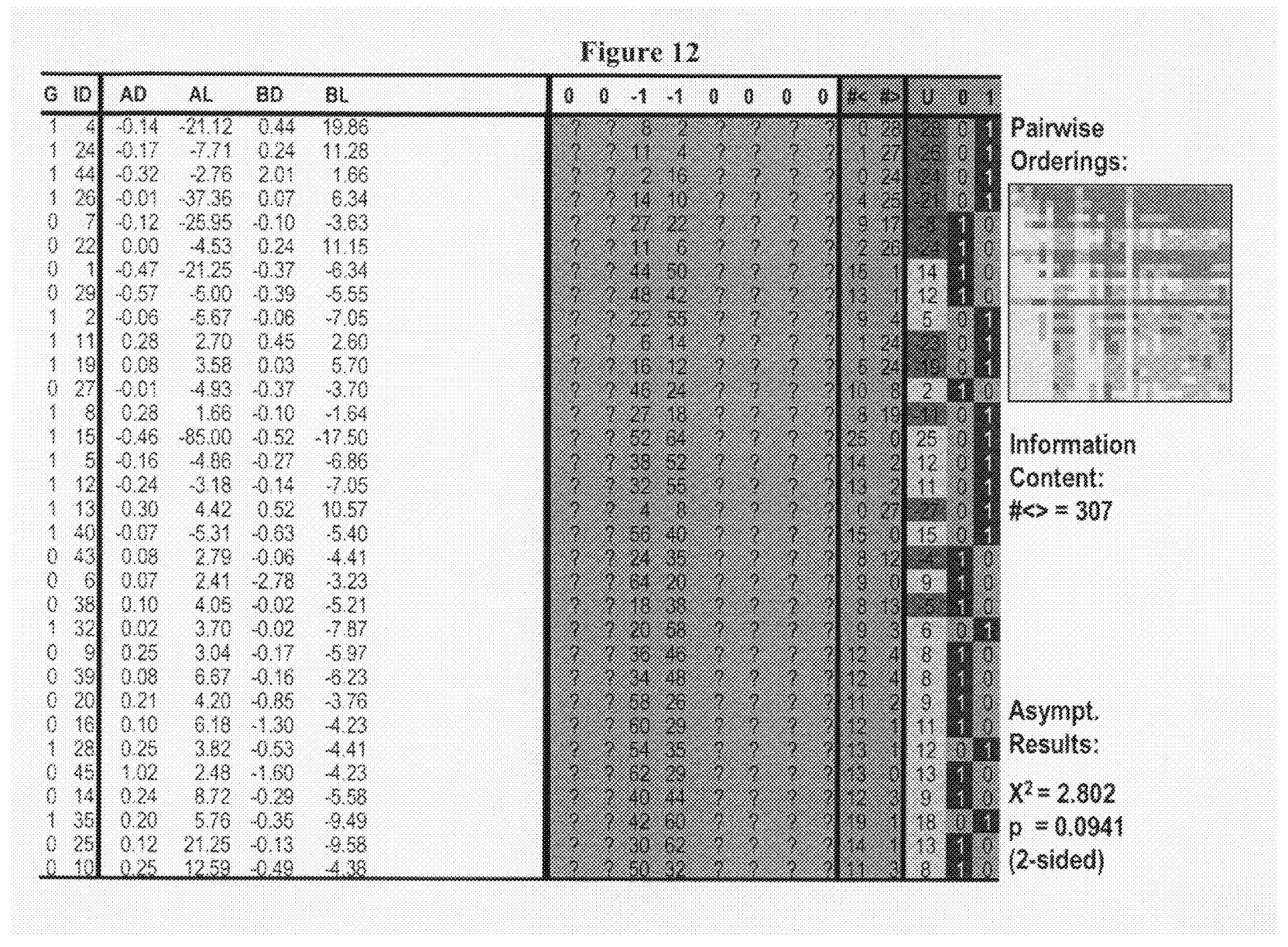

FIG. 12 illustrates analysis of the data in FIG. 10 based on (BD, BL) alone. As in FIG. 11, the subjects are sorted according to their u-scores in FIG. 10. 307 pairs have a known order; the results are significant only at the 0.095 level.

FIG. 13 illustrates the analysis of the FIG. 10 data without drawing on their hierarchical structure, e.g., as (AD, AL, BD, BL). Again, the subjects are sorted according to their u-scores in FIG. 10. Only 129 pairs have a known order based on the four variables; the results are significant only at the 0.075 level.

Figure 14:
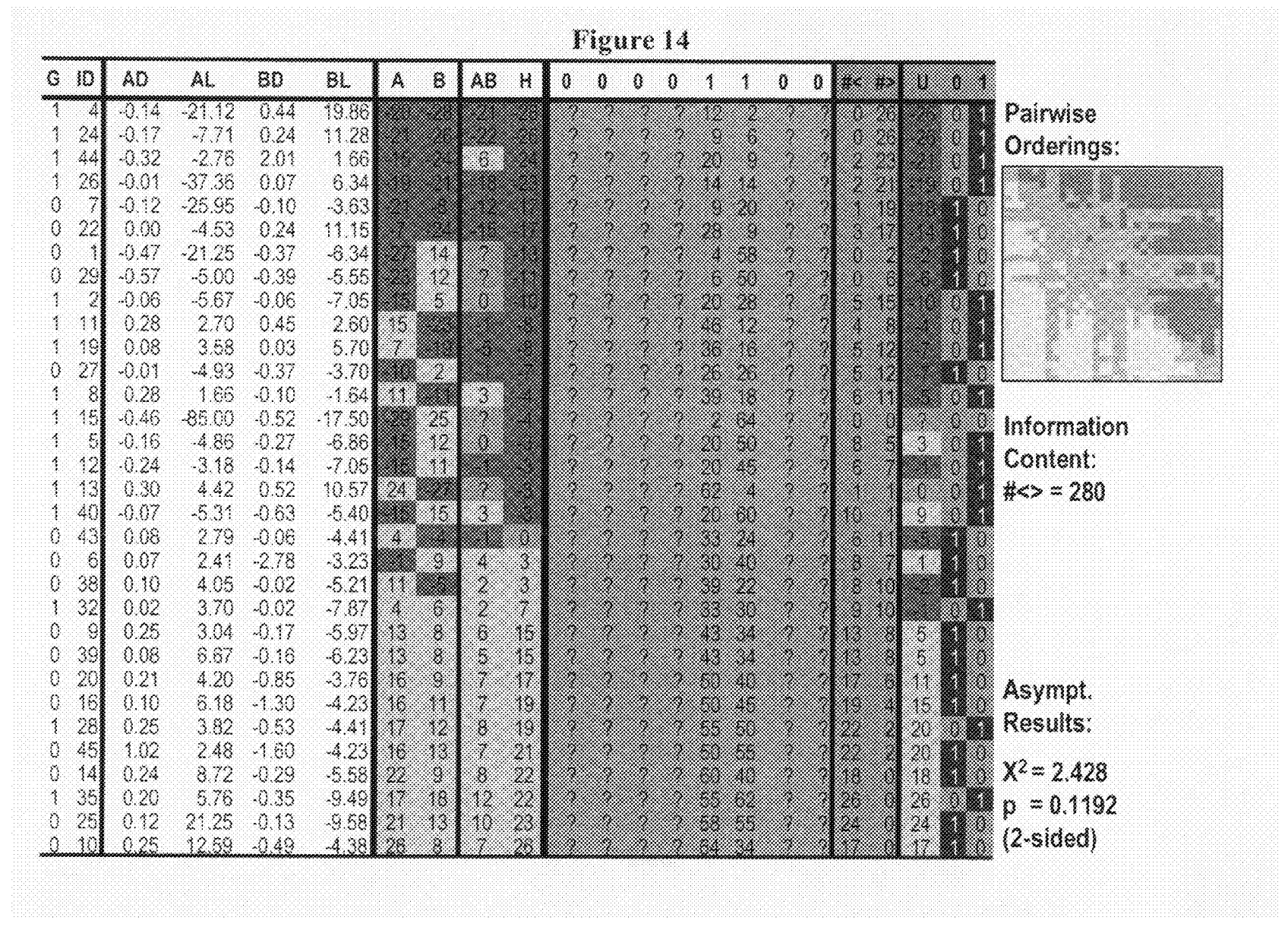

FIG. 14 shows the analysis of the u-scores computed in FIG. 11 and FIG. 12. For comparison, the columns H and AB contain the u-scores from FIG. 10 ((AD, AL), (BD, BL)) and FIG. 13 (AD, AL, BD, BL). Again, the subjects are sorted according to their u-scores in FIG. 10. 280 pairs have a known order based on the two variables; the results are significant only at the 0.120 level.

Figure 15:
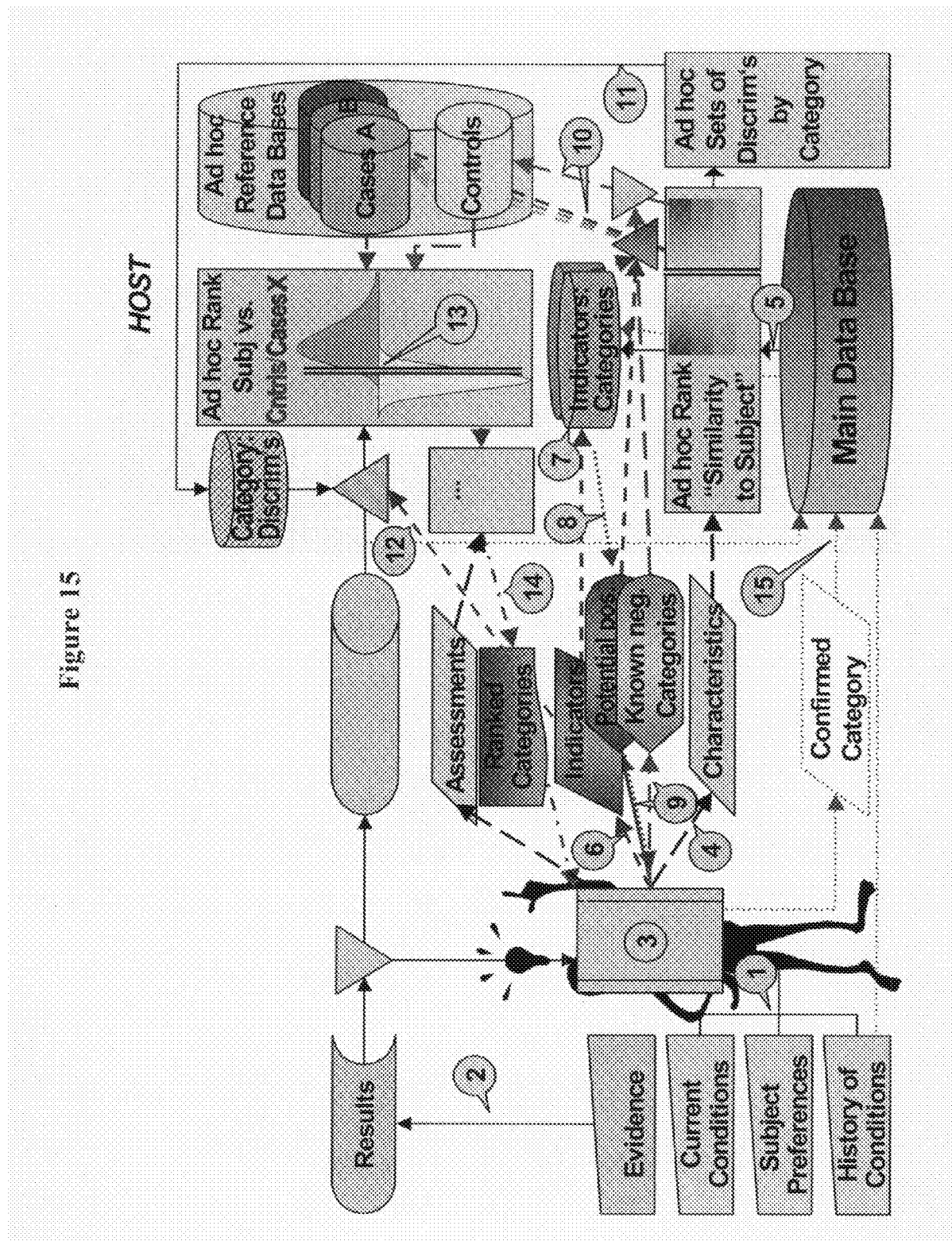

FIG. 15 shows a pictorial representation of an interactive decision support system.

Figure 16:

FIG. 16 shows a partial screen shot of a Froogle product search, for a notebook computer, restricted by processor speed, disk capacity, memory size, product rating, and area.

Figure 17B:
Figure 17A:
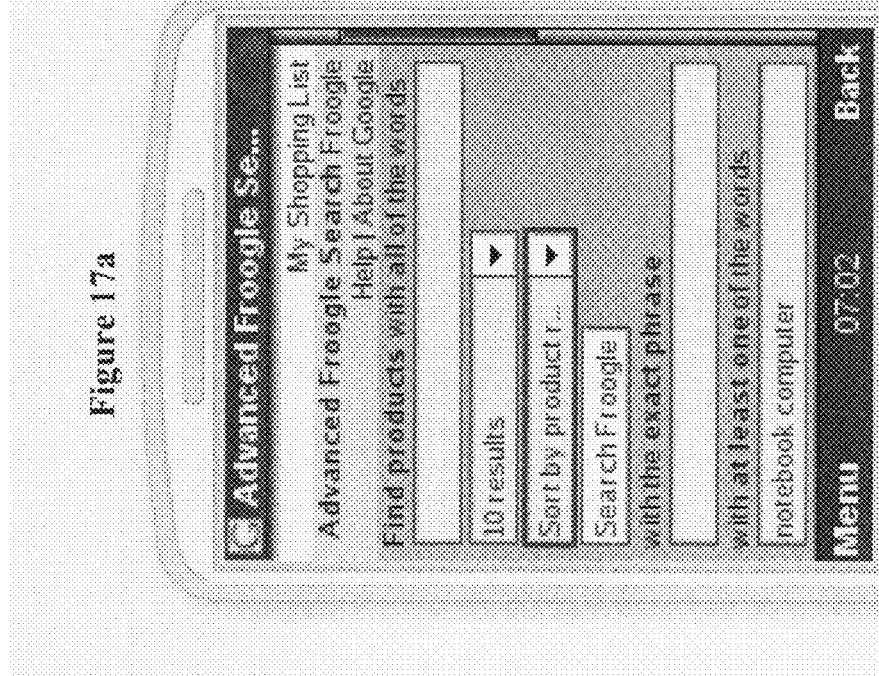

FIG. 17a and FIG. 17b show a Froogle search for two stages of that search similar to that in FIG. 16, this time using the Opera Mini browser on a smartphone (simulated on http://www.operamini.com/demo/)

FIG. 18a-FIG. 18c show three strategies in a preferred graphical user interface designed for a smart phone (see FIG. 17a/b). FIG. 18a shows the strategie of FIG. 16, indicating that at least one of the key words must be present, what the minimum requirements are, and that the results are to be ordered in terms of price. FIG. 18b shows a comparable strategy based on the earlier application 20030182281, where some variables indicate ordinal preferences ('<<', '>>'), in addition to restrictions ('<', '=', '>'). FIG. 18c adds a hierachical structure among the variables and demonstrates usefulness of the instant approach even on a smartphone screen.

Figure 19:
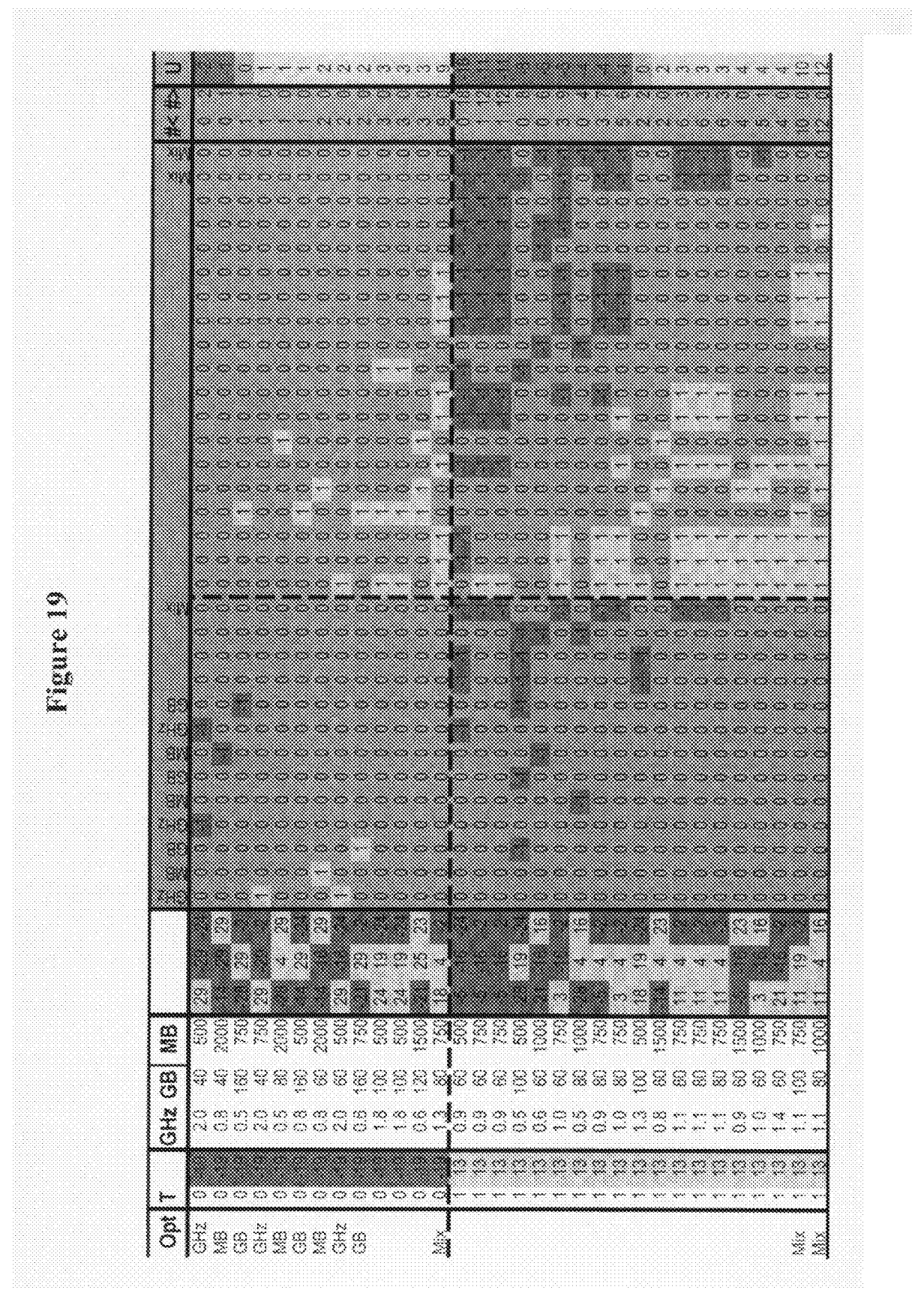

FIG. 19 shows univariate u-scores for a hypothetical data set describing notebook computers by the variables Tablet PC (T, yes/no), processor speed (GHz), disk space (GB), and memory size (MB), the non-hierarchical partial ordering of the earlier application 20030182281, and resulting u-scores for the variables GHz, GB, and MB. The products are sorted by product category (tablet, non-tablet) and then by the trivariate u-scores. Among the 32×(32−1)/2=496 pairwise orders, 98 are non-ambiguous. Column Opt indicates the three 'best' computers by GHz, GB, and MB, as well as the the three computers with the feature 'mix'.

Figure 20:
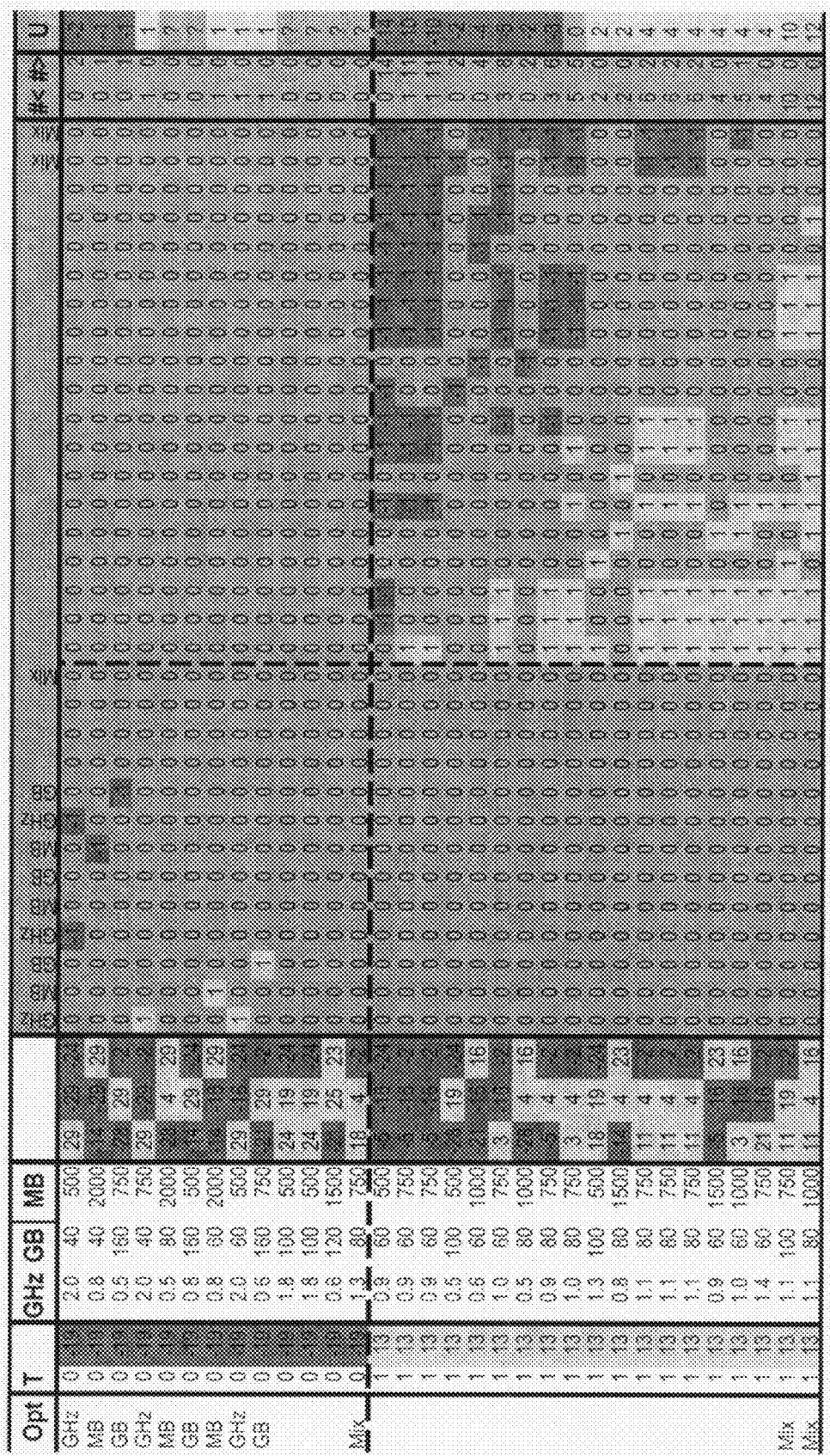

FIG. 20 shows the same data as FIG. 19, but the presence of a touch screen is considered a fourth ordinal variable. Adding the variable Tablet PC in the non-hierarchical fashion of the earlier application 20030182281 reduces the number of non-ambiguous pair-wise orders to 74. As a result, six products cannot be rated at all and only two products are scored favorably.

Figure 21:
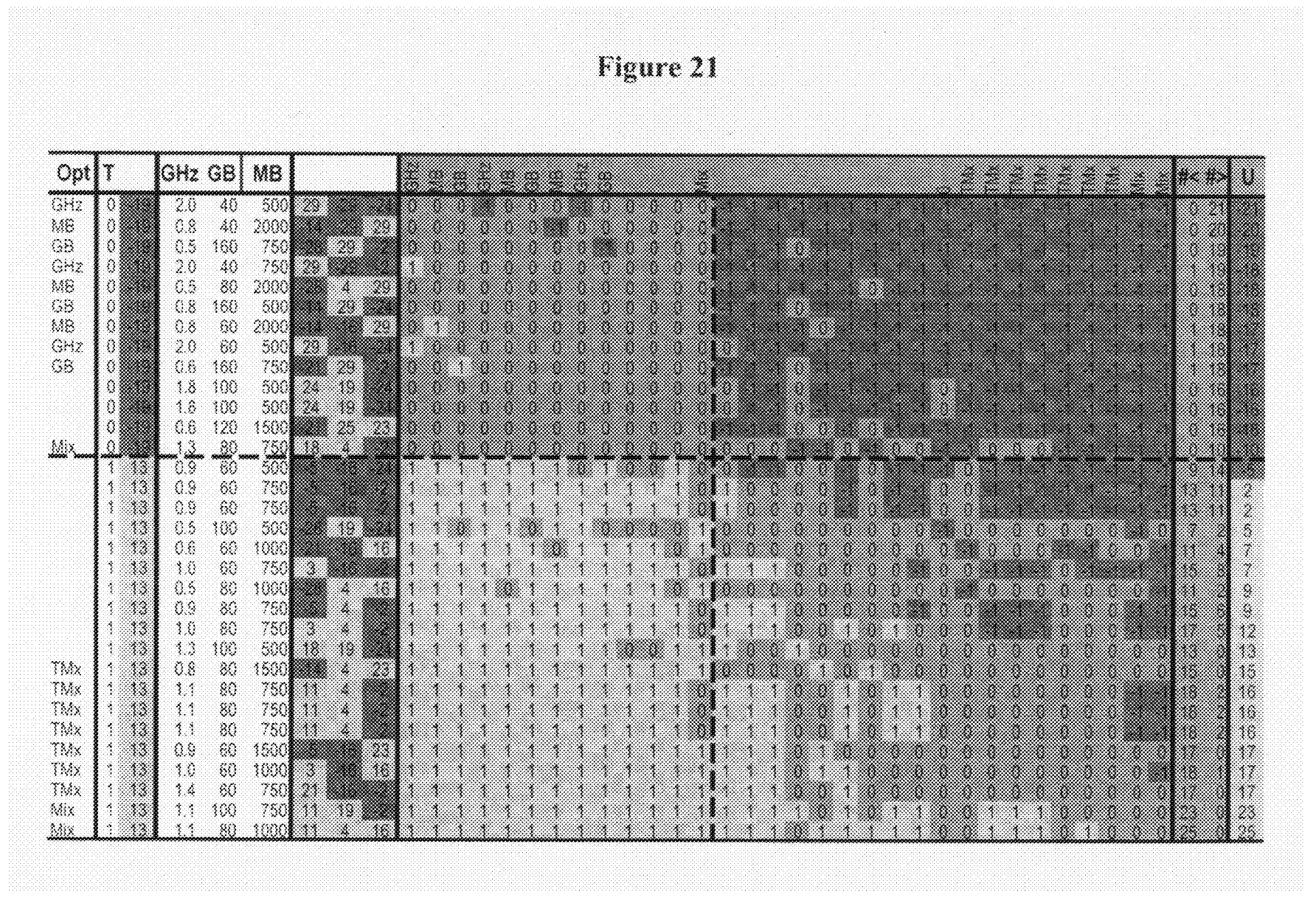

FIG. 21 shows the same data as FIG. 20, but GHz, GB, and MB are considered to be related to a common feature 'power', while Tablet PC is assumed to be related to a feature 'function', allowing the variables to be grouped as (T,(GHz, GB, MB)). Reflecting this hierarchical grouping among the variables when determining the partial ordering, the preferred method increase the number of non-ambiguous pairwise orders to 297,

DETAILED DESCRIPTION OF PREFERRED EMBODIMENTS

The preferred embodiment extends the unifying concept for the statistical analysis of inexact ordinal data, which was set forth in the earlier application 20030182281 and solved shortcomings in dealing with multivariate ordinal data, in general. As did the embodiment in the earlier application 20030182281, the preferred embodiments are 'intrinsically valid', i.e., the do not require external validation. The method enables a variety of statistical tools for decision support, including a decision support system (1) providing automated decision support in a transparent fashion (2) being optionally capable of being controlled by a decision maker (3) providing for evidence acquisition concept, including automatically increasing the content of an underlying database, and (4) providing for an computationally efficient interactive distributed environment.

Statistical Method

A preferred embodiment of the invention described herein introduces a class of intrinsically valid methods for analyzing multivariate ordinal data based on a unifying concept for inexact ordinal data. It will also be appreciated that this conceptualization of the underlying problem provides for solutions to be applied to a wide class of statistical applications.

In view of the extensive use of a set of terminologies in describing various embodiments, where terms are utilized that have been used inconsistently in the literature, the following meanings will be adopted:

Subject: An entity already classified or to be classified as a member of a population.

Linear Model: The linear model is characterized by the assumption that the relationship between the observed variable and the latent factor is linear (after a suitable transformation, if necessary). Such variables are typically called 'interval scaled', because intervals of a given length are comparable with respect to the latent factor. Examples can be found in physics, population dynamics, and economy.

Ordinal: A variable is termed 'ordinal', whenever the relationship between its observations and the latent factor is not necessarily linear, but a larger value of the observed variable merely indicates a larger value of the latent factor. For example, in biological, psychological, genomic, and Web search applications the relationship between the measurement (body temperature, IQ, gene expression, preference indiator) and its meaning (fever, social status, immunity, preference) are usually ordinal, but not linear. An increase in body temperature (observed variable) by two degrees from 35° C. to 37° C., for instance, is usually an irrelevant change in fever (latent factor), while an increase from 41° C. to 43° C. means that a person dies. When a person searches for low price, high quality, and fast delivery, the relationship between the three variables is typically not known.

Partial order: When some entities in a set (or population) can be ordered, but others cannot, any two entities A and B fall into either of four categories: A<B, A>B, A=B, A<>B. Such a 'partial order' can be depicted as a HESSE diagram (see, for instance, FIG. 7), where profiles that can be ordered are connected by lines. (If A<B and B<C, it suffices to connect A with B and B with C.)

Tupel: A set of observations, each belonging to a specific variable is called a tupel. Thus, each multivariate datum is a tupel, Induced multivariate partial order: A set of tupels can be partially ordered in many ways, even if the partial order used for each variable is held constant. One particular partial order for multivariate data can be obtained from a set of ordinal variables, by defining for each pair of tupels the first tupel to be superior to the second, if for all variables the value of the first tupel is superior or equal to the corresponding value of the second tupel, and if for at least one variable the value of the first tupel is superior to the corresponding value of the second tupel.

Scoring: A linear scores (LComb) is computed as a linear combination (weighted average) of different variables' numerical value for a particular entity. The u-statistics approach is based on counting for each tupel the number of tupels known to be superior, equal, or inferior, ignoring pairs where the order cannot be determined.

Aggregation: By choosing different methods of aggregation, scores can be utilized to rank individuals within a populations, to compare populations (analysis of variance), to identify predictors (regression), to separate known sub-populations (classification), and to identify new sub-populations (cluster analysis).

The preferred embodiment also includes the following concepts:

Orientation: An ordinal variable is said to have the same orientation as a latent factor if a difference between two values in the variable is assumed to indicate a difference in the same direction in the latent factor.

Level ordering: For an ordinal variable, the magnitude of a difference has no meaning. Nonetheless, two values A and B are from an oriented variable they can be ordered with respect to their level. If several variables (each allowed to be point, interval, or replication) have the same orientation, the tupels are termed profiles to indicate the possibility of level ordering.

Feature: A known characteristic that several variables are known to be related to.

The preferred embodiment advances the analysis of inexact (multivariate) ordinal data. u-scores have been applied to points, intervals, and, in the earlier application 20030182281 to multivariate ordinal data. The invention proposes a method to compute u-scores in a hierarchical fashion.

Referring to FIG. 8, a preferred embodiment for computation of u-scores comprises several steps:

(1) The array of pairwise orderings depicts for each pair of bi-variate data the order of the left datum compared to the bottom datum as '1' superior, '−1' inferior, '0' equal, or '?' undecided.

(2) The u-scores are computed as the number of inferior entities minus the number of superior entities. To improve readability, the scores can then optionally be standardized in several logically equivalent ways.

Referring to FIG. 8, the preferred approach is based upon representing lattices depicting the lattice spanned by data from n=4 subjects (A, B, C, D) with variables X1, X2, Y1, Y2 (see the illustration in FIG. 7) as n×n matrices.

Referring to FIG. 8, the preferred approach comprises several steps:

(1) Data preparation: The top level (i) node describes the data. For the simplicity of the example it is assumed that all transformations, which allow the generic partial ordering to be applied to the transformed variables, have already been applied. The variables are grouped into two subsets of related variables. For instance, the first variable (X1) may have been the measurement of a particular parameter (X) at time point $t_0$ and the second variable (X2) may be the measurement of the same parameter at time point $t_1$. The third variable (Y1) may have been a 'perfect match' (PM) as determined by Affymetrix software for microarrays and the fourth variable (Y2) a 'mis-match' for the same sequence of 25 bases. Alternatively, X1 and X2 (or Y1 and Y2) may denote the left and the right end of an interval, or may be indicator variables for membership in a regular area of high density with respect to an ordinal characteristic. The choice of only two subsets, the same number of variables per subset, and of only two variables per subset is for the simplicity of the example only. The preferred method allows for arbitrary numbers of levels, arbitrary numbers of variables per subset, and arbitrary rules to decide the order between two subjects based on the variables within a subset.

Figure 9E:
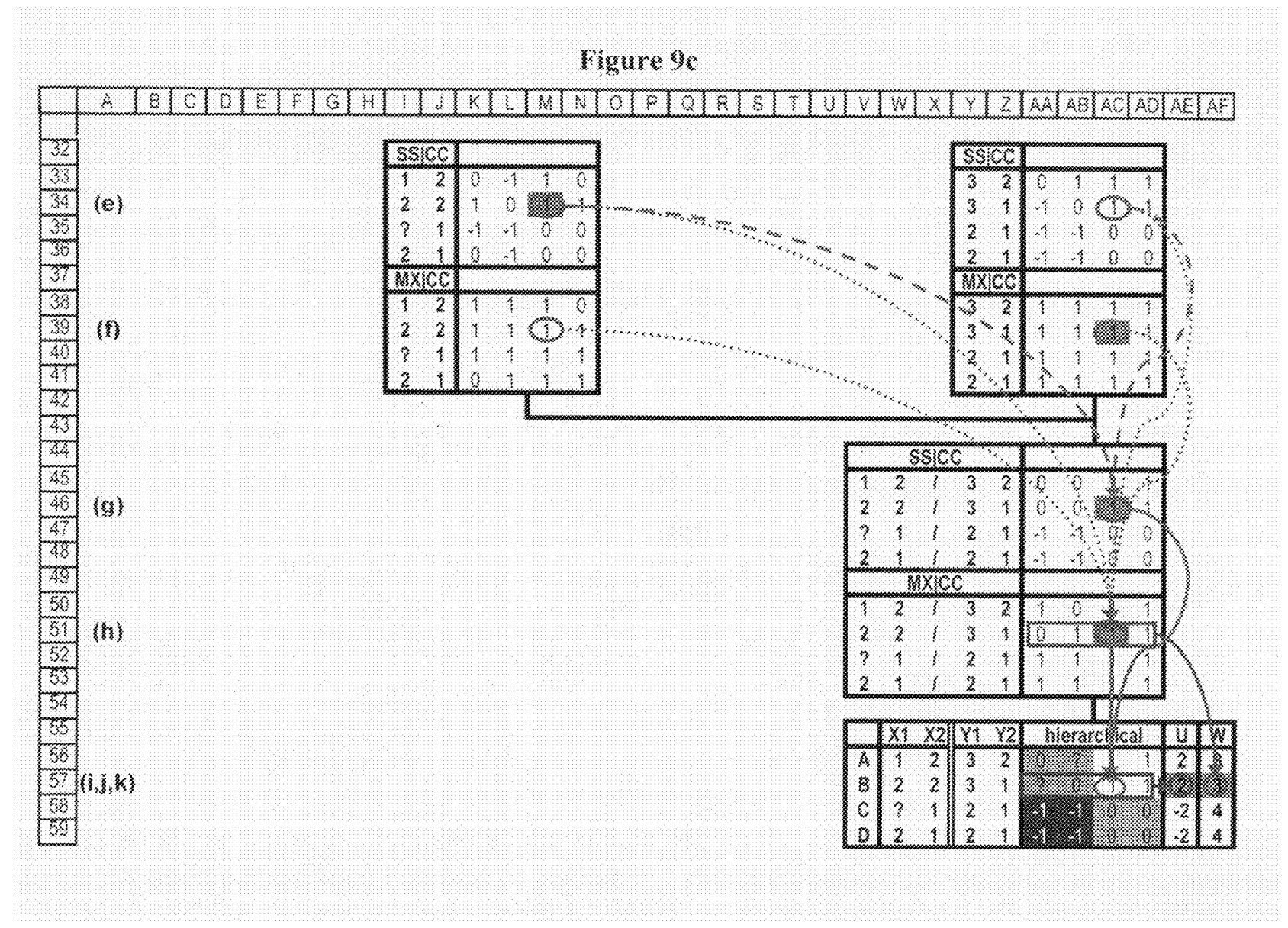

(2) Univariate partial orderings: Level (ii) describes the univariate partial orderings as 4×4 matrices. While this representation is useful for displaying the method, other algorithmic representations may be used for implementation, the algorithms comprising those depicted in FIG. 9.

(3) Multivariate partial orderings: To allow going from univariate (ii) to bivariate (iii) and from bivariate (iii) to hierarchical (iv), the method only relies on the partial ordering, here depicted as 4×4 matrices. For each pair of subjects, the lower-level partial orderings are merged using the following rules:

The diagonal elements is always declared 'identical', even if the observations are 'ambiguous', as for the third subject with variable A1, otherwise If A<B for one of the variables within the subset and A>B for another variable, then the order is declared ambiguous ('?'), otherwise, If A<B for some variables, then B is declared 'superior' and, conversely, if A>B for some variables, then A is declared 'superior', otherwise, (i.e., if A=B for all variables with non-ambiguous outcomes), the two subjects are declared 'identical'.

(4) U-scores and -weights: When the final level is reached, where all information culminates in a single partial ordering, the u-scores and -weights are computed as described in the earlier application 20030182281.

Referring to FIG. 9a-c, an embodiment of the preferred method could be implemented in a Microsoft Excel spreadsheet.

To simplify the embodiment, each matrix comprising elements '−1, 0, 1, ?' is represented as two binary matrices, the first (LE) indicating whether the row subject is 'less or equal' the column subject, the second (GE) indicating whether the row subject is 'larger or equal' the column subject. It should be noted, however, that either of these matrices may suffice with other embodiments, as such shown in the included library below at the end of the specifications.

The preferred embodiment for the spreadsheet environment is based on the following cell formulae, where the letters (a) . . . (k) correspond to the rows in FIG. 9a-c and the particular formulae given are those for the cells indicated through shading:

(a) =IF(OR($B11="?",E$9="?"),0,IF($B11<=E$9,1,0))
(b) =IF(OR($J16="?",M$9="?"),0,IF($J16>=M$9,1,0))
(c) =U16−U11
(d) =IF(OR(AC11,AC16),1,0)
(e) =IF(E22*M22<0,0,SIGN(E22+M22))
(f) =IF(U22*AC22<0,0,MAX(U27,AC27))
(g) =IF(M34*AC34<0,0,SIGN(M34+AC34))
(h) =IF(M34*AC34<0,0,MAX(M39,AC39))
(i) =IF(AC51=1,AC46,"?")
(j) =SUM(AA57:AD57)
(k) =SUM(AA51:AD51)

Formulae (a) and (b) correspond to level (ii) of FIG. 8, formulae (c) and (d) to level (iii) of FIG. 8, and the remaining formulae to level (iv) of FIG. 8.

For each row of n×n matrices, a representative cell is highlighted, the preceding cells are connected by arrows, and its content is displayed in the lower left corner of the diagram. Each matrix is filled by pasting the highlighted cell into all n×n cells.

The preferred application of the subject statistical method to multivariate ordinal data is not restricted to the context of diagnostic support. It is potentially very useful for the analysis of genetic and genomic data of all kinds, currently proposed methods for which are either based on the linear model or on models for categorical (nominal) data.

While preferred embodiments of the invention have been shown and described, it will be clear to those skilled in the art that various changes and modifications can be made without departing from the invention in its broader aspects as set forth in the claims provided hereinafter.

In the earlier application 20030182281, a list of non-limiting examples illustrating various applications of the invention to non-hierarchical variables was provided, the list comprising of (1) ranking countries by gold, silver, and bronze medals, (2) identifying quantitative trait loci for atherosclerosis susceptibility, (3) assessing immune and clinical responses after vaccination of melanoma patients with dendritic cells, (4) ranking adverse event profiles in a clinical trial. (5) assessing changes over time comprising several variables.

The non-limiting EXAMPLE 5 illustrates the extension of the method of u scores to hierarchically grouped data, and the other examples have also been extended (compared to the earlier application 20030182281) to demonstrate the usefulness of the preferred approach across a broad area of potential applications.

Decision Process

A preferred embodiment of the envisioned interactive decision support process is shown in FIG. 15, the arrows indicating flow of information and the rectangles indicating the major steps where the above statistical method is utilized. The process comprises the steps of:

1. The decision maker collects information on the subject to be categorized, comprising variables describing a history of conditions, current conditions, and preferences to be considered in the decision process.
2. Some of this information can be in the form of evidence comprising material samples that needs to be processed into result variables.
3. The decision maker reviews all information obtained from the material samples.
4. The decision maker determines which of the variables are to be considered 'characteristics' and their hierarchical structure.
5. Based on these characteristics, as step (a) of the aforementioned decision process, the system restricts the 'main data base' to an 'ad hoc data base' of objects 'similar' to the entity to be categorized, the method described herein comprising an intrinsically valid method for ranking objects from a single population, the main data base, with respect to their distance to the entity based on a hierarchically structured set of oriented and non-oriented ordinal variables.
6. The decision maker determines which subsets of the variables are to be considered 'indicators' and their hierarchical structure.
7. Based on these subsets of indicators and the 'ad hoc data base', as steps (b) and (c) of the aforementioned decision process, the system then updates an 'Indicators:Categories' knowledge base by screening the ad hoc data base for categories related to these indicator subsets, the method used comprising for each case category an intrinsically valid data based method for comparing the specific case category and the common control categories in the ad-hoc data base with respect to a different hierarchicall structured subset of oriented indicator variable, the method described herein.
8. Based on the updated 'Indicators:Categories' knowledge base, the system then determines a set of (pos.) categories to which the entity might belong, the method used comprising conventional rule based methods and feeds back these categories to the decision maker.
9. The decision maker determines the (pos.) categories to be considered by revising the suggested list of potential positive categories and determines (neg.) categories the entity is already known not to belong to.
10. In step (d) of the aforementioned decision process, the system extracts a separate ad-hoc reference data base for each of the positive categories (cases) and for the union of the negative categories (controls).
11. Based on the ad-hoc data base, in step (e) of the aforementioned decision process, the system then updates for each case category the 'category:discriminators' knowledge base by screening the ad hoc data base for ad-hoc set of discriminator variables, the method used comprising for each case category an intrinsically valid data based method for discriminating the specific case category and the common control categories in the ad-hoc data base with respect to different hierarchically structured subsets of oriented ordinal indicator variables, the method described herein.
12. If requested by the decision maker, some indicators can be included as discriminators for all case categories.
13. For each case category and its specific hierarchically structured ad hoc set of discriminators, the ad hoc rank of the entity with respect to the cases (sn: sensitivity) and controls (sp: specificity) is determined in step (f) of the aforementioned decision process, the method comprising an intrinsically valid method for positioning an entity with respect to objects from two populations based on the case-specific hierarchically structured set of discriminator variables determined above, the method described herein.
14. From the results of the ad-hoc ranking of the entity vs. each of the case categories (sn: sensitivity, sp: specificity) and the permanent rules contained in the 'category: consequences' knowledge base, categories are then ranked (step (h) of the aforementioned decision process) according to assessment criteria, the criteria comprising of sensitivity and specificity, hierarchically structured criteria describing entity independent consequences of type-I and type-II errors, and hierarchically structured criteria describing consequences of type-I decisions the method comprising an intrinsically valid method described herein.
15. For the categories ranked most relevant by entity independent criteria, the decision maker may then add hierarchically structured assessment variables describing entity specific preferences to be added temporarily to the 'category:consequences' knowledge base (step (h) of the aforementioned decision process),. These assessments enable the system to modify the ranking of the categories to reflect entity preferences, the method comprising the same method as used in the previous step.
16. Once the categorization is confirmed, which may require additional time and or evaluations, the entity record in the main data base is updated and the main data base is screened for evidence of new rules that might be utilized to update the conventional rule bases mentioned in steps 7 (indicators:categories) and 11 (category: discriminators), above, the method used comprising the intrinsically valid methods described in the aforementioned steps.

The decision process of the preferred embodiment of the invention includes a variety of protocols which resolve many of the problems that render the traditional decision process invalid. For multivariate variables, a mechanism is provided for several variables being comprehensively assessed. Also provided is a mechanism by which reference data records are selected from a larger database, so that each data record is similar in a well-defined sense to the characteristics of a test entity's data record. Also provided is a mechanism to automatically select the discriminating variables for every individual decision depending on the desired specifics, and the characteristics of a test entity. While traditional norm ranges address specificity only, the invention provides a mechanism that allows each case category to be assigned also a sensitivity estimate. Once an entity's data record has been assigned sensitivity and specificity with respect to a control category and one or more case categories the invention provides a mechanism by which decisions on how to categorize the test entity can be prioritized.

The major problems of conventional expert systems were lack of transparency, difficulty of direct control, and problems with knowledge acquisition. Lack of transparency resulted mainly from reliance of these systems on subjective 'certainty factors' during the iterative application of 'heuristics'. The proposed system, in contrast, primarily uses deterministic rules (step 7: If <indicators(s)> are present then consider <category>; step 11: when testing for <category> then use <discriminators>). Since the rule based decisions are not applied iteratively with 'certainty' determined by BAYES' law, there is little need to assign subjective 'certainty factors' to each rule. Moreover, since the consequences of rule based decisions are subject to subsequent data based confirmation, there is no need to be overly restrictive with respect to the rules. Since the 'restriction' of this set is driven by actual data, rather than 'heuristics', the process is both transparent and valid.

Since the system is more transparent, it is easier for the decision maker to control it. The decision maker controls the decision process by deciding which categories to include as case categories, which categories to include among the controls category, and describes the hierarical structure among these categories. Starting from a basic set of potential categories determined, based on the set of indicators initially selected by the decision maker, the decision maker can change the set of indicators and/or edit the list of case categories. The decision maker can also control the system by changing the list of characteristics, discriminators, and assessment variables. Since the decision maker can compare the ranking of the categories returned for different sets of variables chosen in a 'sensitivity analysis', the consequences of these choices become immediately apparent.

In previous expert systems, knowledge acquisition was problematic, because it was impracticable to find, agree upon, and enter a workable set of 'heuristics'. To address this problem, the preferred approach proposes a system where only data is entered, while 'knowledge' is generated by using conventional statistical methods, optionally incorporating some of the proposed statistical methodology, albeit from subsets of the database that are restricted to entities with the same characteristics as query entity. Historical data on the entity (including the results of previously performed categorizations) add immediately to the database. Once the categorization is confirmed, this data set can also be added to the database. Based on the increased main data base, the rule base comprising the rule bases mentioned in steps 7 (indicators: categories) and 11 (category:discriminators), above, can then be updated. Thus a key obstacle of previously proposed decision support systems (expert systems) has been overcome.

Identifying such rules can be extremely computationally extensive. To find the 'best' sets of discriminators among 100 potential discriminators, for instance, there are 10,000 possible subsets of two and 1,000,000 subsets of three variables, which leads to a long-standing problem in the field. Usually, focus is on those variables which are at least somewhat predictive univariately. For a restricted set of 20 variables, the number of three parameter subsets reduces to $20^3=8000$. Thus, the proposed separation of an ad-hoc data base from the main data base increases the feasibility of the approach. This number is further reduced if some of these variables overlap with the indicators requested by the decision maker, as is to be expected. If three of these symptoms are preselected, the number of three parameter subsets reduces to $17^3=4900$, which is large, though manageable, especially when computationally efficient variants of the method are used and an array of computers is used, as proposed, to process many sets of variables in parallel.

Assisted & Interactive Diagnostic Support Embodiment

The preferred embodiment is exemplified in the application for assisted and interactive diagnostic support to a physician in diagnosing a patient. In a traditional diagnostic process until recently, in diagnosing a patient, a physician would carry out a physical examination, collect the patient's disease history, discuss the patient's preferences with regard to pain tolerance, occupation, religious believes, social status, family history, and such like, and view the patient's laboratory results. The physician would then view the available information, sort those deemed relevant information into symptoms and patient characteristics, and compare them with a putative set of potential diseases. Finally, the physician would form an opinion of the most likely diagnoses, and prioritize them by their likelihood in that instance, their likely urgency, the patient's preferences, and the relevant medical facilities' allowance for cost. The therapy would then be decided based on the diagnosis with the highest priority.

Recently, laboratories have begun to assist the physician in making sense of the increasing number of parameters tested (herein subsequently termed 'symptoms') by flagging those symptoms that are outside a 'normal range', usually given as $x.\pm 2\times SD$ of the published distribution among a 'standard' normal population. Clearly, this has not been sufficient to fully support the physician in diagnosis, as indicated by the following problems:

1. Ad-hoc database: Published 'standard' populations may not be representative for the particular patient. Thus, a physician clearly would find ranges based on an 'ad hoc' population with characteristics similar to the characteristics of this patient more informative.
2. Ordinal variables: Most biological variables are merely ordinal, i.e., the relationship between the differences in measurement and differences in clinical relevance are not known. Thus, mean (x.) and standard deviation (SD) may have no simple interpretation so that a physician would clearly rather have ranges be determined based on the actual shape of each parameter's empirical distribution in the particular population.
3. Pattern: While symptoms can usually be assumed to have the same orientation as the underlying latent factor 'disease severity', patient characteristics can usually not be assumed to have a common orientation. Thus, the physician would need specific methods to deal with 'pattern' of non-oriented variables.
4. Multivariate data: Looking at a individual parameters (i.e., a single variable) may not be sufficient to determine how indicative the clinical 'picture' is for a specific disease. Thus, a physician would like to comprehensively assess the multivariate distribution of several parameters.
5. Features: Variables can often be grouped by 'features', 'features' by 'meta features, and so forth. Variables associated with efficacy are typically different from variables associated with safety, variables can also often be grouped by various clinical and quality-of-life features. Clearly, a physician would like to allow the system to take advantage of his/her knowledge about the hierarchical structure of the variables.

6. Sensitivity/specificity: A large deviation of a symptom from the normal (specificity) is not necessarily indicative of a disease, and even if it should be, it does not necessarily hint to a specific disease. Thus, the physician clearly would like to know for which disease(s) the patient's variables are likely.
7. Information Content: Information content of partial orderings decreases as the number of variables increases. Thus, the physician would like to use methods that minimize this loss of information content so that more relevant variables can be included.
8. Control: A data base driven system for diagnostic support will never be able to fully automate the decision process. Thus, the physician must be able to control the system.
9. Transparency: To be able to trust the systems decisions and to exert control, the physician must understand he underlying principle.
10. Availability: Of course, for the system to be useful, results must be presented in a timely fashion. This requires (a) that algorithms are employed that are sufficiently efficient and (b) that the physician can interact with the system from the bedside or from his office.
11. Expandability: One of the most daunting problems with expert systems in the past has been knowledge acquisition. For the proposed system to be useful, it must provide efficient means for knowledge acquisition.

Ideally, a physician would select the symptoms judged most relevant for the particular patient and compare them not only to normal individuals, but also to cases known to have different diseases. From the patient's score with respect to a comparable controls (healthy individuals), giving a specificity index, and from the patient's score with respect to comparable cases (patients known to have one of several disease), giving a list of sensitivity indices, the physician would be provided an objective decision criterion.

Given the desire for diagnostic support, it is not surprising that many of the first 'expert systems' developed in the late 1970s and early 1980s aimed at assisting medical diagnoses: MYCIN for bacterial infections, PUFF for lung function tests, INTERNIST and CADUCEUS for internal medicine, CASNET and GLAUCOMA for glaucoma. These systems tried to rely on 'knowledge' stored in form of 'heuristics', such as IF <symptom> THEN <disease> WITH <certainty factor>.

These heuristics were then iteratively combined using the well known BAYES' theorem. None of these systems, however, has gained widespread acceptance, primarily because they merely tried to mimic the human decision process, rather than striving at overcoming its shortcomings by utilizing advances in technology to go beyond the 'heuristic' nature of human decision making. In the first place, the iterative use of BAYES' theorem lacks transparency (problem 9). Moreover, it turned out to be difficult to acquire a sufficiently large set of rules and to have different 'experts' agree on the 'certainty factors' (problem 11, expandability).

The preferred embodiment differs from this approach fundamentally, in that the decision process is not driven by a set of 'heuristics', describing the experience accumulated by some physicians with patients of different characteristics presenting with various symptoms and later confirmed as having a specific disease. Instead, individual records of characteristics, symptoms, and confirmed disease are entered directly into a data base and the relevant rules are created 'ad hoc' by accumulating evidence from relevant records. Thus, subjective 'certainty factor' are replaced by objective empirical 'sensitivity', guaranteeing both transparency and accountability.

In a first step, the invention addresses problem 1 by providing a mechanism for assembling an ad-hoc database, by which ad-hoc reference subjects are selected from a larger database of reference subjects, so that the ad-hoc reference subjects are similar to the patient with respect to a set of characteristics determined by the physician. Since these characteristics need to be considered in a comprehensive fashion (problem 4), the invention provides for methods that can handle multivariate data. Because the majority of these characteristics are expected to be ordinal variables (problem 2), conventional statistical methods based on the linear model would require external validation. To overcome this problem, the invention provides an intrinsically valid statistical method to rank subjects in the reference population with respect to several ordinal characteristics. Moreover, because patient characteristics are not necessarily related to a common latent factor, the invention provides a variant of such methods that allow for patients to be ranked according to the distance of their pattern (problem 3) of characteristics from the characteristics of the test patient. Even when the features of the a latent factor (or higher order feature) have the same orientation, variables related to different features are likely to be affected by different sources of random errors, so that including variables related to different features in determining pairwise orderings increases the chance of resulting in ambiguous pairwise orderings. The present application provides for a method to reduce loss of Information Content by utilizing knowledge (problem 7) about the hierarchical structure of variables with respect to features.

In a second step, the invention addresses problem 2 by providing a mechanism to determine 'normal ranges' for (ordinal variables). Assuming that the main data base consists of healthy individuals only, conventional statistical methods could then be used to determine the specificity of the patients outcome for each symptom.

Clearly, when assembling data for a reference data base, not all individuals will be 'healthy' in every regard. It would be difficult, for instance, to find elderly individuals, who have neither cardiovascular disease, rheumatic disease, diabetes, nor depression. Thus, elderly patients with diabetes might still be considered as 'controls' for elderly patients with depression, and vice versa. Thus, it would be desirable, even necessary, to allow the physician to describe the meaning of 'healthy' (when aiming at a diagnosis for a particular patient) more precisely. If one acknowledges that many of the records in the main data base represent individuals with some sort of disease, however, one can use the same data base to address problem 6 (sensitivity). The preferred embodiment provides a mechanism by which the physician selects the diseases to be considered as case categories, and the diseases to be allowed into the control category (the specifics of which are described below). The preferred embodiment then provides a mechanism, by which for each disease category, and for the union of categories of 'healthy' subjects, reference subjects are selected from the ad-hoc data base of subjects similar to the patient, the mechanism comprising conventional selection based on the subjects confirmed disease.

Clearly, for different symptoms, different sets of diseases need to be considered. Thus, the invention provides a mechanism by which deterministic 'rules' (without the need to employ certainty factors) are used:

IF <symptom> THEN CONSIDER <disease>.

As these rules are not applied iteratively, no 'certainty factors' need to be assigned and, consequently, the process is both transparent and objective. Initially, such rules can be based on textbook knowledge. As the main data base grows, however, the system itself will be able to update these rules, including adding new rules. The process by which the system is able to perform this task is described below. Finally, the invention provides a mechanism by which the physician can modify the list of symptoms to be used, either globally or for specific diseases.

Once the patient- and the disease-specific ad hoc reference populations have been selected, each patient is compared both with the patient-specific population of controls (specificity) and with patient-/disease-specific cases (sensitivity). For this purpose, conventional statistical methods for univariate ordinal data could be used, as long as symptoms are analyzed individually.

Clearly, however, looking at one symptom at a time is not sufficient (see problem 4). Moreover, when dealing with multivariate data where at least some variables are ordinal, looking at one population (either cases or controls) at a time does not utilize all relevant information available. To resolve this problem (6), the preferred embodiment provides a mechanism, by which, for each disease, information from both the disease-specific and the healthy ad-hoc reference population are combined when determining the position of the patient among the disease population (sensitivity) and among the 'healthy' population (specificity), the mechanism being essentially same as for selecting the patients, except that a larger data set is used for determining the order within each population than for the relative position of the test patient, and that the common orientation of the symptoms with disease severity allows for a level metric to be employed. Because the ad-hoc reference populations are relatively small and the requirements regarding accuracy are higher when positioning a patient within these reference patients, than when selecting these reference populations in the first place, the invention provides a variant of such method with maximal validity.

Clearly, for different diseases, different subsets of symptoms need to be used. In fact, using irrelevant symptoms, which may not have the same orientation with disease severity as the relevant symptoms, may be counterproductive. For this purpose, the invention provides a mechanism by which deterministic 'rules' (without the need to employ certainty factors) are used:

IF <disease> THEN USE <symptoms>.

As before, as these rules are not applied iteratively, no 'certainty factors' need to be assigned and, consequently, the process is both transparent and objective. Initially, such rules can be based on textbook knowledge. As the main data base grows, however, the system itself will be able to update these rules, including adding new rules. The process by which the system is able to perform this task is described below. Finally, the invention provides a mechanism by which the physician can exert modify the list of diseases to be used, either globally or for specific ad-hoc populations.

Once sensitivity and specificity for each disease category have been determined, the diseases can be prioritized. The invention provides for the physician to enter the consequences of type-I errors (false positive decisions) and type-II errors (false negative decisions) for each disease, so that the final prioritizing of the diseases can reflect urgency of treatment, the patient's preferences, and cost can also be reflected together with sensitivity and specificity as obtained from the data base, mechanism being based on the intrinsically valid method for multivariate ordinal data with augmentation for cost. Clearly, these variables relate to different features, comprising those named, such as severity, side-effects, cost, and preferences. The invention provides a mechanism by which variables can be hierarchically associated with such features, thereby increasing information content.

Other Embodiments

The preferred application of the subject statistical method to multivariate ordinal data is not restricted to the context of diagnostic support. It is potentially very useful for the analysis of genetic and genomic data of all kinds, currently proposed methods for which are either based on the linear model or on models for categorical (nominal) data.

While a preferred embodiments of the invention have been shown and described in the context of medicine and biology, it will be clear to those skilled in the art that various changes and modifications can be made without departing from the invention in its broader aspects as set forth in the claims provided hereinafter.

Another non-limiting example for data base driven decisions where objects characterized in a data base need to be scored based on several ordinal cirterial is the selection of most 'preferred' objects, when several variables determine 'preference'. As a non-limiting example, the decision which product(s) has (have) the best relationship between price and 'value' (including, but not limited to, shopping portals such as froogle, expedia, Shopping) often lacks a natural scale on which 'value' can be based. In view of FIG. 16, some applications may be more simple than diagnostic support. The 'characteristics' determining which objects to choose (step 5) and 'discriminators' (step 11) may be over-lapping or identical, and a single category my suffice (step 10). Still the method of the earlier application 20030182281 provided for the first objective solution to the central question of how to sort products by their overall 'value' based on features comprising performance, durability, time, and aesthetics (step 13). The preferred method now provides for means to group variables by such features, thereby overcoming one of the major obstacles left with the earlier application 20030182281, namely that information content decreases when the number of unstructured variables increases.

EXAMPLE 1

Ranking Countries by Gold, Silver, and Bronze Medals

To illustrate the general applicability of the invention we provide an evaluation of computing u-scores for data with arbitrary partial orderings for a reanalyzation of the medal counts from the 2002 Winter Olympics in Salt Lake City (Table 1).

TABLE 1

Medals won at the 2002 Winter Olympics by country and category (Nordic: Cross Country, Combined, Biathlon; Alphine: Downhill, Free Style, Snow Board; Outdoors: Bobsled, Luge, Skeleton; Indoors: Curling, FIG. Skating, Ice Hockey, Short Track, Speed Skating)

| Country | N-CC | | | N-Cb | | | N-Bi | | | A-DH | | | A-FS | | | A-SB | | | O-BS | | | O-Lg | | |
|---|---|---|---|---|---|---|---|---|---|---|---|---|---|---|---|---|---|---|---|---|---|---|---|---|
| | G | S | B | G | S | B | G | S | B | G | S | B | G | S | B | G | S | B | G | S | B | G | S | B |
| Germany | 1 | 2 | 1 | 1 | 3 | | 3 | 5 | 1 | | | 1 | | | | | | | 2 | 1 | 1 | 2 | 2 | 1 |
| Norway | 3 | 4 | 3 | | | | 4 | 2 | | 2 | 1 | 1 | 1 | | | | | | | | | | | |
| U.S. | | | | | | | | | | | | 2 | | | 3 | 2 | 1 | 2 | 1 | 1 | 1 | | 1 | 1 |
| Canada | | | 1 | | | | | | | | | | 1 | 1 | | | | | | | | | | |
| Russia | 3 | 3 | 1 | | | | 1 | | 2 | | | | | | | | | | | | | | | |
| Italy | 2 | 2 | 1 | | | | | | | 1 | 1 | 1 | | | | | | 1 | | | | 1 | | |
| France | | | | | | | | 1 | 1 | 2 | 2 | | | | | 1 | 1 | 2 | | | | | | |
| Austria | | 1 | 1 | | | 3 | | 1 | | 2 | 2 | 4 | | | | | | | | | | | | 1 |
| Switzerland | | | 1 | | | | | | | | | 1 | | | | 1 | | 1 | | 1 | 1 | | | |
| Netherlands | | | | | | | | | | | | | | | | | | | | | | | | |
| Finland | | | | 3 | 1 | | | | | | | 1 | | | | | | | | | | | | |
| China | | | | | | | | | | | | | | | | | | | | | | | | |
| Croatia | | | | | | | | | | 3 | 1 | | | | | | | | | | | | | |
| Korea | | | | | | | | | | | | | | | | | | | | | | | | |
| Estonia | 1 | 1 | 1 | | | | | | | | | | | | | | | | | | | | | |
| Sweden | | | | | | | | | 2 | | 1 | 1 | | | | | 1 | | | | | | | |
| Australia | | | | | | | | | | | | | 1 | | | | | | | | | | | |
| Spain | 2 | | | | | | | | | | | | | | | | | | | | | | | |
| Great Britain | | | | | | | | | | | | 1 | | | | | | | | | | | | |
| Bulgaria | | | | | | | | | 1 | | | | | | | | | | | | | | | |
| Czech | | 1 | | | | | | | | | | 1 | | | | | | | | | | | | |
| Poland | | | | | | | | | | | | | | | | | | | | | | | | |
| Japan | | | | | | | | | | | | | | | | 1 | | | | | | | | |
| Belarus | | | | | | | | | | | | | | | | 1 | | | | | | | | |
| Slovenia | | | | | 1 | | | | | | | | | | | | | | | | | | | |
| | 12 | 13 | 11 | 4 | 4 | 4 | 8 | 8 | 8 | 10 | 10 | 10 | 4 | 4 | 4 | 4 | 4 | 4 | 3 | 3 | 3 | 3 | 3 | 3 |

| Country | O-Sk | | | O-SJ | | | I-Cu | | | I-FS | | | I-IH | | | I-SH | | | I-SS | | |
|---|---|---|---|---|---|---|---|---|---|---|---|---|---|---|---|---|---|---|---|---|---|
| | G | S | B | G | S | B | G | S | B | G | S | B | G | S | B | G | S | B | G | S | B |
| Germany | | | | | | | | | | | | | | | | | | | 3 | 3 | 2 |
| Norway | | | | | | | 1 | | | | | | | | | | | | | | 2 |
| U.S. | 2 | 1 | | | | | | | | 1 | | 2 | | | 2 | 1 | 1 | 1 | 3 | 1 | 4 |
| Canada | | | | | | | | 1 | 1 | 1 | | | 2 | | | 2 | 1 | 3 | 1 | | 2 |
| Russia | | | | | | | | | | 2 | 3 | | | | 1 | | 1 | | | | |
| Italy | | | | | | | | | | | | 1 | | | | | 1 | | | | |
| France | | | | | | | | | | 1 | | | | | | | | | | | |
| Austria | | 1 | | | | | | | | | | | | | | | | | | | |
| Switzerland | | | 1 | 2 | | | | 1 | 1 | | | | | | | | | | 3 | 5 | |
| Netherlands | | | | | | | | | | | | | | | | | | | | | |
| Finland | | | | 1 | 1 | | | | | | | | | | | | | | | | |
| China | | | | | | | | | | | | | | 1 | | 2 | 2 | 3 | | | |
| Croatia | | | | | | | | | | | | | | | | | | | | | |
| Korea | | | | | | | | | | | | | | | | 2 | 2 | | | | |
| Estonia | | | | | | | | | | | | | | | | | | | | | |
| Sweden | | | | | | | | | | | | | | | | | | | 1 | | |
| Australia | | | | | | | | | | | | | | | | 1 | | | | | |
| Spain | | | | | | | | | | | | | | | | | | | | | |
| Great Britain | | 1 | | | | | 1 | | | | | | | | | | | | | | |
| Bulgaria | | | | | | | | | | | | | | | | | | | 1 | 1 | |
| Czech | | | | | | | | | | | | | | | | | | | | | |
| Poland | | | | 1 | 1 | | | | | | | | | | | | | | | | |
| Japan | | | | | | | | | | | | | | | | | | | | 1 | |
| Belarus | | | | | | | | | | | | | | | | | | | | | |
| Slovenia | | | | | | | | | | | | | | | | | | | | | |
| | 2 | 2 | 2 | 2 | 2 | 2 | 2 | 2 | 2 | 5 | 3 | 4 | 2 | 2 | 2 | 8 | 8 | 8 | 10 | 10 | 10 |

A total of n=25 countries $C_i$ won at least one medal at the 2002 Winter Olympics. Let $g_i$, $s_i$ and $b_i$ denote the number of gold, silver, and bronze medals won by country $C_i$. Four different linear model weighting schemes are commonly used to rank countries.

Identical: $IScr = g + s + b$
Linear: $LScr = 3g + 2s + 1b$
Exponential: $EScr = 2^2 g + 2^1 s + 2^0 b$
Hierarchical: $HScr = \lceil \max_i b_i \rceil \lceil \max_i s_i \rceil g + \lceil \max_i b_i \rceil s + b$ where a ceiling $\lceil x \rceil$ is any integer larger than x. Since no country had more than 100 medals in any category, 100 can be used as the ceiling for both bronze and silver medals. Table 2 gives the medal counts and the different rankings for three commonly used weighting schemes (uniform, linear, exponential, hierarchical) based on the linear model. Germany, Slovenia, and Belarus are the only countries where the rankings based on the four different linear models agree.

TABLE 2

Medals won at the 2002 winter Olympics in Salt Lake City by country with scores and ranks for different linear model weighting schemes.

| Country | G | S | B | IScr | IRg | LScr | LRg | EScr | ERg | HScr | HRg |
|---|---|---|---|---|---|---|---|---|---|---|---|
| Germany | 12 | 16 | 7 | 35 | 1.0 | 75 | 1.0 | 87 | 1.0 | 121607 | 1.0 |
| Norway | 11 | 7 | 6 | 24 | 3.0 | 53 | 3.0 | 64 | 3.0 | 110706 | 2.0 |
| U.S.A | 10 | 13 | 11 | 34 | 2.0 | 67 | 2.0 | 77 | 2.0 | 101311 | 3.0 |
| Canada | 6 | 3 | 8 | 17 | 4.0 | 32 | 5.0 | 38 | 5.0 | 60308 | 5.0 |
| Russia | 6 | 6 | 4 | 16 | 5.5 | 34 | 4.0 | 40 | 4.0 | 60604 | 4.0 |
| Italy | 4 | 4 | 4 | 12 | 7.0 | 24 | 7.0 | 28 | 6.5 | 40404 | 7.0 |
| France | 4 | 5 | 2 | 11 | 8.5 | 24 | 7.0 | 28 | 6.5 | 40502 | 6.0 |
| Austria | 2 | 4 | 10 | 16 | 5.5 | 24 | 7.0 | 26 | 8.0 | 20410 | 12.0 |
| Switzerland | 3 | 2 | 6 | 11 | 8.5 | 19 | 9.5 | 22 | 9.5 | 30206 | 10.0 |
| Netherlands | 3 | 5 | 0 | 8 | 10.5 | 19 | 9.5 | 22 | 9.5 | 30500 | 9.0 |
| Finland | 4 | 2 | 1 | 7 | 12.0 | 17 | 11.0 | 21 | 11.0 | 40201 | 8.0 |
| China | 2 | 2 | 4 | 8 | 10.5 | 14 | 12.0 | 16 | 12.0 | 20204 | 13.0 |
| Croatia | 3 | 1 | 0 | 4 | 14.5 | 11 | 13.0 | 14 | 13.0 | 30100 | 11.0 |
| Korea | 2 | 2 | 0 | 4 | 14.5 | 10 | 14.0 | 12 | 14.0 | 20200 | 14.0 |
| Estonia | 1 | 1 | 1 | 3 | 17.0 | 6 | 17.0 | 7 | 18.0 | 10101 | 17.0 |
| Sweden | 0 | 2 | 4 | 6 | 13.0 | 8 | 15.0 | 8 | 16.0 | 204 | 20.0 |
| Australia | 2 | 0 | 0 | 2 | 21.0 | 6 | 17.0 | 8 | 16.0 | 20000 | 15.5 |
| Spain | 2 | 0 | 0 | 2 | 21.0 | 6 | 17.0 | 8 | 16.0 | 20000 | 15.5 |
| Great Britain | 1 | 0 | 2 | 3 | 17.0 | 5 | 19.0 | 6 | 19.0 | 10002 | 18.0 |
| Bulgaria | 0 | 1 | 2 | 3 | 17.0 | 4 | 20.5 | 4 | 21.0 | 102 | 21.0 |
| Czech Rep. | 1 | 0 | 1 | 2 | 21.0 | 4 | 20.5 | 5 | 20.0 | 10001 | 19.0 |
| Poland | 0 | 1 | 1 | 2 | 21.0 | 3 | 22.5 | 3 | 22.5 | 101 | 22.5 |
| Japan | 0 | 1 | 1 | 2 | 21.0 | 3 | 22.5 | 3 | 22.5 | 101 | 22.5 |
| Slovenia | 0 | 0 | 1 | 1 | 24.5 | 1 | 24.5 | 1 | 24.5 | 1 | 24.5 |
| Belarus | 0 | 0 | 1 | 1 | 24.5 | 1 | 24.5 | 1 | 24.5 | 1 | 24.5 |

Column Headings:
G/S/B: Number of gold, silver, and bronze medals, respectively.
IScr/IRg: Scores and ranks for identical (1:1:1) weighting.
LScr/LRg: Scores and ranks for linear (3:2:1) weighting.
EScr/ERg: Scores and ranks for exponential (4:2:1) weighting.
HScr/HRg: Scores and ranks for hierarchical (10000:100:1) weighting.

The u-score method differs from methods based on the linear model in that it does not require specific weights to be assigned to the different medal categories. Instead, a partial ordering can be defined to reflect the specific circumstances. Here, it is reasonable to assume that gold medals are more valuable than silver medals, which, in turn, are more valuable than bronze medals. Still, the relative value of the medals cannot be reasonably specified. Thus, one can describe the success of a county by three derived variables, the total number of medals ($\geq B$), the total number of silver and gold medals ($\geq S$), and the total number of gold medals (G). Countries can then be partially ordered as follows.

Country $C_i$ is considered more successful than county $C_{i'}$, if it has at least as many medals in each of the categories 'G', '$\geq$S', and '$\geq$B' and more medals in at least one of these categories.

$$C_i >_{medals} C_{i'}$$
$$\Leftrightarrow$$
$$(g_i, s_i, b_i) >_{medals} (g_{i'}, s_{i'}, b_{i'})$$
$$\Leftrightarrow$$
$$\begin{cases} [\{g_i + s_i + b_i \geq g_{i'} + s_{i'} + b_{i'}\} \wedge \{g_i + s_i \geq g_{i'} + s_{i'}\} \wedge \{g_i \geq g_{i'}\}] \\ \wedge \\ [\{g_i + s_i + b_i > g_{i'} + s_{i'} + b_{i'}\} \vee \{g_i + s_i > g_{i'} + s_{i'}\} \vee \{g_i \geq g_{i'}\}] \end{cases}$$

This ordering is only 'partial', because there may exist pairs of countries that cannot be ordered. Austria and Switzerland, for instance, cannot be ordered. The (mid) rankings URg based on the u-scores for the data in Table 2 are given in Table 3.

Figure 1:
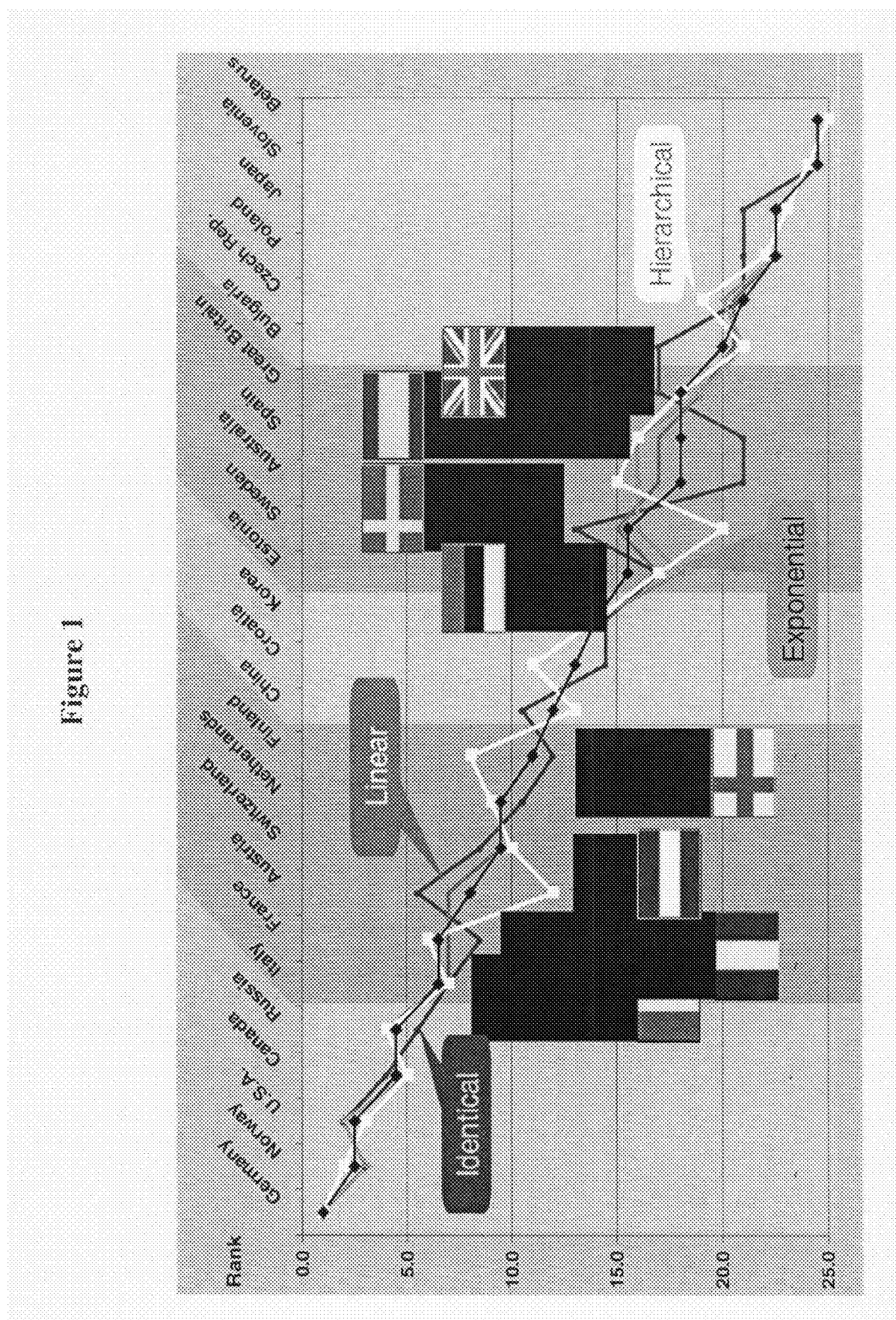
FIG. 1 shows a comparison of four rankings of countries by medal profiles based on three different linear models (Table 2) with the ranking based on u-scores (Table 3).

From Table 3, ties (countries having the same rank) can be classified into two categories. Australia and Spain form 'exact' ties, because they have the same pairwise orderings with respect to all other countries. Great Britain, however, though having the same score, can be ordered with respect to Bulgaria and Estonia, while Australia and Spain cannot. Thus, the tie between Britain and Australia/Spain is 'inexact'. FIG. 1 shows how the different scoring methods affect the ranking of the countries. Austria and Finland, for instance, are ranked 6:12 with identical weighting or 12:8 with hierarchical weighting.

Further in the manner that u-scores are constructed some pairs of countries are considered exact ties (Norway/USA, Canada/Russia, Italy/France, Switzerland/Netherlands, Australia/Spain, Poland/Japan, Slovenia/Belarus, FIG. 2) and, thus, given identical ranks. Under the different linear models, however, the rank ratio for countries within an exact tie may differ. In the above example, the Switzerland/Netherlands rank ratio ranges from 8.5:10.5 to 10:9.

TABLE 3

Ranking of Countries based on u-scores for the data in Table 2.

| Country | G≥S≥B | | | G N U C R I F A S N F C C K E S A S G B C P J S B | #< #> | | UScr | URg |
|---|---|---|---|---|---|---|---|---|
| Germany | 12 | 28 | 35 | | 24 | 0 | 12.0 | 1.0 |
| Norway | 11 | 18 | 24 | | 22 | 1 | 10.5 | 2.5 |
| U.S.A. | 10 | 23 | 34 | | 22 | 1 | 10.5 | 2.5 |
| Canada | 6 | 9 | 17 | | 20 | 3 | 8.5 | 4.5 |
| Russia | 6 | 12 | 16 | | 20 | 3 | 8.5 | 4.5 |
| Italy | 4 | 8 | 12 | | 17 | 5 | 6.0 | 6.5 |
| France | 4 | 9 | 11 | | 17 | 5 | 6.0 | 6.5 |
| Austria | 2 | 6 | 16 | | 13 | 5 | 4.0 | 8.0 |
| Switzerland | 3 | 5 | 11 | | 14 | 7 | 3.5 | 9.5 |
| Netherlands | 3 | 8 | 8 | | 14 | 7 | 3.5 | 9.5 |
| Finland | 4 | 6 | 7 | | 13 | 7 | 3.0 | 11.0 |
| China | 2 | 4 | 8 | | 12 | 10 | 1.0 | 12.0 |
| Croatia | 3 | 4 | 4 | | 11 | 10 | 0.5 | 13.0 |
| Korea | 2 | 4 | 4 | | 10 | 13 | -1.5 | 14.0 |
| Estonia | 1 | 2 | 6 | | 7 | 14 | -3.5 | 15.5 |
| Sweden | 0 | 2 | 6 | | 5 | 12 | -3.5 | 15.5 |
| Australia | 2 | 2 | 2 | | 5 | 14 | -4.5 | 18.0 |
| Spain | 2 | 2 | 2 | | 5 | 14 | -4.5 | 18.0 |
| Great Britain | 1 | 1 | 3 | | 6 | 15 | -4.5 | 18.0 |
| Bulgaria | 0 | 1 | 3 | | 4 | 17 | -6.5 | 20.0 |
| Czech Rep. | 1 | 1 | 2 | | 4 | 18 | -7.0 | 21.0 |
| Poland | 0 | 1 | 2 | | 2 | 21 | -9.5 | 22.5 |
| Japan | 0 | 1 | 2 | | 2 | 21 | -9.5 | 22.5 |
| Slovenia | 0 | 0 | 1 | | 0 | 23 | -11.5 | 24.5 |
| Belarus | 0 | 0 | 1 | | 0 | 23 | -11.5 | 24.5 |

Column Headings:
G ≧ S ≧ B: Number of gold, gold or silver, and total medals, respectively.
G N U . . . : Matrix of pairwise orderings.
< # >: Number of less/more successful countries.
UScr/URg: Scores and ranks by U statistics.

Still, cross country skiing, biathlon, alpine skiing, short track skating, and speed skating with 12, 8, 10, 8, and 10, competitions are overrepresented, so that countries strong in curling and ice hockey with only two competitions each are disadvantaged.

Treating each competition as an independent variable, however, creates so may categories that (among the countries having at least one medal) no two countries can be ordered. Even after adding up medals withing the 45 groups of competitions u0: (N-CC-G), . . . (I-SS-B)

results in a limited information content of 7.216 only, with five idiosyncratic countries. Grouping competitions into the 15 official categories of Table 1 (three cum. counts, each)

| U1: | (N-CC), (N-Cb), (N-Bi), |
|---|---|
| | (A-DH), (A-FS), (A-SB), |
| | (O-BS), (O-Lg), (O-Sk), (O-SJ), |
| | (I-Cu), (I-FS), (I-IH), (I-SH), (I-SS) | confirms Norway and Canada to 'lead' and Belarus to 'lag', but the information content for the other countries is not sufficient to reliably score them (total information content: 8.617). The Netherlands, Sweden, and Bulgaria still cannot be ordered with any of the other countries of the above countries (Table 4, column U1).

Further grouping categories as 'nordic', 'alpine', 'outdoors', and 'indoors'

| U2: | ( (N-CC), (N-Cb), (N-Bi) ), |
|---|---|
| | ( (A-DH), (A-FS), (A-SB) ), |
| | ( (O-BS), (O-Lg), (O-Sk), (O-SJ) ), |
| | ( (I-Cu), (I-FS), (I-IH), (I-SH), (I-SS) ) | increases information content to 18.386 and, thus allows all countries to be reliably scored.

TABLE 4

Increasing nformation Content with hierarchical U-scores for the data in Table 2.

| Country | UScr | URg | U0 | W0 | U1 | W1 | U2 | U2Rg | W2 | Diff | U2Rg | Country |
|---|---|---|---|---|---|---|---|---|---|---|---|---|
| Germany | 24 | 1.0 | 2 | 0.346 | 3 | 0.400 | 15 | 2.5 | 0.800 | 1.5 | 1.0 | Italy |
| Norway | 21 | 2.5 | 4 | 0.447 | 5 | 0.490 | 15 | 2.5 | 0.800 | 0.0 | 2.5 | Germany |
| U.S. | 21 | 2.5 | 2 | 0.346 | 3 | 0.400 | 9 | 7.0 | 0.632 | 4.5 | 2.5 | Norway |
| Canada | 17 | 4.5 | 2 | 0.346 | 5 | 0.490 | 11 | 5.5 | 0.748 | 1.0 | 4.0 | Switzerland |
| Russia | 17 | 4.5 | 2 | 0.346 | 2 | 0.346 | 5 | 10.0 | 0.632 | 5.5 | 5.5 | Canada |

TABLE 4-continued

Increasing nformation Content with hierarchical U-scores for the data in Table 2.

| Country | UScr | URg | U0 | W0 | U1 | W1 | U2 | U2Rg | W2 | Diff | U2Rg | Country |
|---|---|---|---|---|---|---|---|---|---|---|---|---|
| Italy | 12 | 6.5 | 2 | 0.346 | 2 | 0.346 | 17 | 1.0 | 0.849 | −5.5 | 5.5 | France |
| France | 12 | 6.5 | 1 | 0.283 | 1 | 0.283 | 11 | 5.5 | 0.800 | −1.0 | 7.0 | U.S. |
| Austria | 8 | 8.0 | 1 | 0.283 | 2 | 0.346 | 6 | 9.0 | 0.632 | 1.0 | 8.0 | Sweden |
| Switzerland | 7 | 9.5 | 1 | 0.283 | 2 | 0.346 | 13 | 4.0 | 0.800 | −5.5 | 9.0 | Austria |
| Netherlands | 7 | 9.5 | NA | 0.000 | NA | 0.000 | −11 | 21.0 | 0.748 | 11.5 | 10.0 | Russia |
| Finland | 6 | 11.0 | 3 | 0.400 | 3 | 0.400 | 4 | 11.0 | 0.693 | 0.0 | 11.0 | Finland |
| China | 2 | 12.0 | 1 | 0.283 | 1 | 0.283 | −9 | 19.0 | 0.721 | 7.0 | 12.0 | Great Britain |
| Croatia | 1 | 13.0 | NA | 0.000 | −1 | 0.283 | −12 | 23.0 | 0.748 | 10.0 | 13.0 | Bulgaria |
| Korea | −3 | 14.0 | −1 | 0.283 | −2 | 0.346 | −12 | 23.0 | 0.748 | 9.0 | 14.0 | Australia |
| Estonia | −7 | 15.5 | −4 | 0.447 | −4 | 0.490 | −9 | 19.0 | 0.693 | 3.5 | 15.5 | Czech |
| Sweden | −7 | 15.5 | NA | 0.000 | NA | 0.000 | 7 | 8.0 | 0.849 | −7.5 | 15.5 | Japan |
| Australia | −9 | 18.0 | 1 | 0.283 | −1 | 0.400 | −5 | 14.0 | 0.748 | −4.0 | 17.0 | Poland |
| Spain | −9 | 18.0 | −3 | 0.400 | −4 | 0.490 | −9 | 19.0 | 0.693 | 1.0 | 19.0 | China |
| Great Britain | −9 | 18.0 | NA | 0.000 | −1 | 0.283 | 3 | 12.0 | 0.693 | −6.0 | 19.0 | Estonia |
| Bulgaria | −13 | 20.0 | NA | 0.000 | NA | 0.000 | −4 | 13.0 | 0.721 | −7.0 | 19.0 | Spain |
| Czech | −14 | 21.0 | 0 | 0.346 | −1 | 0.400 | −6 | 15.5 | 0.721 | −5.5 | 21.0 | Netherlands |
| Poland | −19 | 22.5 | −2 | 0.346 | −2 | 0.346 | −7 | 17.0 | 0.566 | −5.5 | 23.0 | Croatia |
| Japan | −19 | 22.5 | −1 | 0.400 | −2 | 0.447 | −6 | 15.5 | 0.775 | −7.0 | 23.0 | Korea |
| Belarus | −23 | 24.5 | −8 | 0.600 | −8 | 0.600 | −14 | 25.0 | 0.800 | 0.5 | 23.0 | Slovenia |
| Slovenia | −23 | 24.5 | −3 | 0.400 | −3 | 0.400 | −12 | 23.0 | 0.775 | −1.5 | 25.0 | Belarus |
| IC weight | | | | 7.216 | | 8.617 | | | 18.386 | | | |

Compared to the non-hierarchical scoring (Table 3), hierarchical scoring improves the scores for countries with a 'balanced' performance profile (e.g., Italy and Switzerland), while countries with medals in only on category (Netherlands: speed skating, Croatia: downhill skiing, Korea: Short track skating) are penalized.

EXAMPLE 2

Quantitative Trait Loci for Atherosclerosis Susceptibility in Apolipoprotein E-deficient Mice ApoE-deficient mice on 6 inbred genetic backgrounds were compared for atherosclerosis lesion size in the aortic root in two independent studies. Data were normalized to the C57BL/6 strain, which was used in both studies. A mouse SNP database was then used to correlate lesion size with SNP pattern on chromosome 1, where atherosclerosis QTL had been previously identified. The in silice QTL are candidates for further study to confirm the presence of, and identify, atherosclerosis susceptibility genes.

Most cases of coronary heart disease (CHD) can be attributed to or associated with atherosclerosis. Large epidemiological studies have shown that approximately half of those who develop CHD have only moderate total plasma cholesterol levels of <250 mg/dl. Thus, elucidating genetic risk factors involved in atherosclerosis susceptibility could lead to better therapeutic intervention for those most likely to develop atherosclerosis who do not have obvious plasma lipid risk factors.

Mouse models are one of the most useful tools for experimental atherosclerosis research. Mice made deficient in apoE by gene targeting have elevated plasma cholesterol levels and spontaneously develop severe atherosclerosis with lesions similar in many aspects to human lesions. ApoE-deficient mice on the C57BL/6 background have lesions ~8-fold larger than apoE-deficient mice on the FVB/N background, with a broad distribution overlapping in the $F_2$ generation. Atherosclerosis susceptibility loci have been previously described in wildtype mice using high-cholesterol cholic acid-containing diets to induce lesions. Ath1, initially described using two sets of recombinant inbred (RI) strains derived from the atherosclerosis susceptible C57BL/6 and atherosclerosis resistant C3H strains, and the C57BL/6 and BALB/c strains, maps to chromosome 1.

A computational approach, termed 'in silico' QTL mapping, has recently been proposed to accelerate the mapping of atherosclerosis susceptibility genes. We have modified this method to eliminate some inconsistencies and then compared this improved method based on the linear model to a novel approach based on u-statistics for multivariate data. Genetic differences along the mouse genome between strains based on a SNP database were correlated to phenotypic differences, allowing us to identify chromosomal regions that may contain atherosclerosis susceptibility genes.

ApoE-deficient mice using J1 129/SV-ter embryonic stem cells were bred back 10 generations onto the DBA/2J (DBA), and AKR/J (AKR) backgrounds. ApoE-deficient mice were bred back 10 generations onto the C57BL/6 (C57) background. The RU mice were maintained on an inbred 129/SV-ter (129) background, and subsequently bred onto the C57BL/6 (C57), BALB/cByJ (BLB), and C3H/HeJ (C3H) backgrounds Lesions in the aortic root were quantified. A wide distribution of lesion areas sizes among the strains implied significant genetic differences among the strains with respect to atherosclerosis susceptibility. From each strain, three representative observations were used for analysis: x.−SD, x., and x.+SD of log lesion area.

TABLE 5

Representative lesion area sizes after standardization

| DBA | C57 | 129 | AKR | BLB | C3H |
|---|---|---|---|---|---|
| 306 | 146 | 90 | 32 | 24 | 19 |
| 237 | 84 | 27 | 18 | 13 | 6 |
| 183 | 53 | 8 | 10 | 7 | 2 |

Inbred strains are always homozygous at all marker loci. Marker loci were considered informative, if (a) the marker was available for all six strains, (b) the markers were not all identical, and (c) the marker pattern was not the same as on both of the adjacent loci. Of the 237 markers available on chromosome 1, 49 were informative.

TABLE 6

Alleles at the first 21 informative marker loci on chromosome 1 by strain.

| | Mrk# | | | | | | | | | | | | | | | | | | | | |
|---|---|---|---|---|---|---|---|---|---|---|---|---|---|---|---|---|---|---|---|---|---|
| | 2 | 14 | 18 | 25 | 27 | 55 | 57 | 59 | 74 | 77 | 84 | 86 | 107 | 108 | 121 | 122 | 123 | 125 | 126 | 132 | 136 |
| cM | 4.4 | 5.5 | 8.7 | 15.3 | 17.5 | 25.1 | 25.1 | 25.1 | 31.7 | 32.8 | 33.9 | 34.2 | 37.2 | 38.4 | 49.2 | 49.2 | 49.2 | 51.4 | 51.4 | 54.6 | 57.9 |
| DBA | t | c | t | g | g | g | c | t | g | g | c | c | t | t | c | c | a | g | g | g | g |
| C57 | c | t | c | t | g | g | t | t | g | t | a | t | t | t | c | c | a | g | g | g | g |
| 129 | c | t | t | t | g | g | c | c | g | g | c | c | c | t | g | c | g | a | c | g | g |
| AKR | c | t | t | t | t | c | c | t | a | g | c | c | t | a | c | a | a | a | c | g | g |
| BLB | c | t | t | g | g | g | t | c | a | t | c | t | t | t | c | a | a | a | c | g | g |
| C3H | c | t | t | t | g | g | c | t | g | g | c | c | c | a | g | c | g | g | c | a | a |

To identify chromosomal regions that may contain atherosclerosis susceptibility genes, we correlated genetic differences to phenotypic differences by two statistical methods. The first method is a variant of the recently proposed 'in silico' method. This method requires counting strain-pair allele differences for each pair of strains. For six strains (see Table 5), the number of strains pairs is 5+4+3+2+1=15. For the 'in silico' method, it was originally proposed to aggregate allele differences within of 30 cM width and move these bins in steps of 10 cM across the genome. For better comparability with the method proposed below, we moved bins of n markers (n=1 . . . 10) in single marker steps. Also, we computed the correlation coefficient not on the difference in lesion sizes but on the rank of the ratios (see Table 7).

TABLE 7

Computation of 'in silico' correlation (standardized as (r + 1)/2) between phenotypic differences (rank of ratios, column PRg) and genotypic differences (markers 2-121) for bins of 1-10 adjacent informative markers.

| | | Mrk# | | | | | | |
|---|---|---|---|---|---|---|---|---|
| | PRg | 2 | 14 | 18 | 25 | 27 | 55 | 57 |
| DBA | | t | c | t | g | g | g | c |
| C57 | | c | t | c | t | g | g | t |
| 129 | | c | t | t | t | g | g | c |
| AKR | | c | t | t | t | t | c | c |
| BLB | | c | t | t | g | g | g | t |
| C3H | | c | t | t | t | g | g | c |
| DBA: | | | | | | | | |
| C57 | 4 | 1 | 1 | 1 | 1 | 0 | 0 | 1 |
| 129 | 8 | 1 | 1 | 0 | 1 | 0 | 0 | 0 |
| AKR | 13 | 1 | 1 | 0 | 1 | 1 | 1 | 0 |
| BLB | 14 | 1 | 1 | 0 | 0 | 0 | 0 | 1 |
| C3H | 15 | 1 | 1 | 0 | 1 | 0 | 0 | 0 |
| C57: | | | | | | | | |
| 129 | 3 | 0 | 0 | 1 | 0 | 0 | 0 | 1 |
| AKR | 7 | 0 | 0 | 1 | 0 | 1 | 1 | 1 |
| BLB | 9 | 0 | 0 | 1 | 1 | 0 | 0 | 0 |
| C3H | 10 | 0 | 0 | 1 | 0 | 0 | 0 | 1 |
| 129: | | | | | | | | |
| AKR | 2 | 0 | 0 | 0 | 0 | 1 | 1 | 0 |
| BLB | 5 | 0 | 0 | 0 | 1 | 0 | 0 | 1 |
| C3H | 6 | 0 | 0 | 0 | 0 | 0 | 0 | 0 |
| AKR: | | | | | | | | |
| BLB | 11 | 0 | 0 | 0 | 1 | 1 | 1 | 1 |
| C3H | 12 | 0 | 0 | 0 | 0 | 1 | 1 | 0 |
| BLB: | | | | | | | | |
| C3H | 1 | 0 | 0 | 0 | 1 | 0 | 0 | 1 |
| 1 | | 0.73 | 0.73 | 0.39 | 0.53 | 0.58 | 0.58 | 0.36 |
| 2 | | 0.73 | 0.59 | 0.44 | 0.59 | 0.58 | 0.45 | 0.28 |
| 3 | | 0.73 | 0.67 | 0.58 | 0.50 | 0.59 | 0.51 | 0.35 |
| 4 | | 0.67 | 0.65 | 0.63 | 0.54 | 0.52 | 0.43 | 0.38 |
| 5 | | 0.67 | 0.65 | 0.69 | 0.64 | 0.47 | 0.45 | 0.44 |
| 6 | | 0.65 | 0.69 | 0.70 | 0.57 | 0.39 | 0.45 | 0.40 |
| 7 | | 0.65 | 0.69 | 0.70 | 0.64 | 0.50 | 0.40 | 0.41 |
| 8 | | 0.69 | 0.70 | 0.64 | 0.59 | 0.49 | 0.37 | 0.37 |
| 9 | | 0.69 | 0.70 | 0.64 | 0.59 | 0.58 | 0.44 | 0.35 |
| 10 | | 0.70 | 0.64 | 0.59 | 0.58 | 0.52 | 0.41 | 0.35 |

TABLE 7-continued

Computation of 'in silico' correlation (standardized as (r + 1)/2) between phenotypic differences (rank of ratios, column PRg) and genotypic differences (markers 2-121) for bins of 1-10 adjacent informative markers.

| | Mrk# | | | | | | | |
|---|---|---|---|---|---|---|---|---|
| | 59 | 74 | 77 | 84 | 86 | 107 | 108 | 121 |
| DBA | t | g | g | c | c | t | t | c |
| C57 | t | g | t | a | t | t | t | c |
| 129 | c | g | g | c | c | c | t | g |
| AKR | t | a | g | c | c | t | a | c |
| BLB | c | a | t | c | t | t | t | c |
| C3H | t | g | g | c | c | c | a | g |
| DBA: | | | | | | | | |
| C57 | 0 | 0 | 1 | 1 | 1 | 0 | 0 | 0 |
| 129 | 1 | 0 | 0 | 0 | 0 | 1 | 0 | 1 |
| AKR | 0 | 1 | 0 | 0 | 0 | 0 | 1 | 0 |
| BLB | 1 | 1 | 1 | 0 | 1 | 0 | 0 | 0 |
| C3H | 0 | 0 | 0 | 0 | 0 | 1 | 1 | 1 |
| C57: | | | | | | | | |
| 129 | 1 | 0 | 1 | 1 | 1 | 1 | 0 | 1 |
| AKR | 0 | 1 | 1 | 1 | 1 | 0 | 1 | 0 |
| BLB | 1 | 1 | 0 | 1 | 0 | 0 | 0 | 0 |
| C3H | 0 | 0 | 1 | 1 | 1 | 1 | 1 | 1 |
| 129: | | | | | | | | |
| AKR | 1 | 1 | 0 | 0 | 0 | 1 | 1 | 1 |
| BLB | 0 | 1 | 1 | 0 | 1 | 1 | 0 | 1 |
| C3H | 1 | 0 | 0 | 0 | 0 | 0 | 1 | 0 |
| AKR: | | | | | | | | |
| BLB | 1 | 0 | 1 | 0 | 1 | 0 | 1 | 0 |
| C3H | 0 | 1 | 0 | 0 | 0 | 1 | 0 | 1 |
| BLB: | | | | | | | | |
| C3H | 1 | 1 | 1 | 0 | 1 | 1 | 1 | 1 |
| 1 | 0.35 | 0.48 | 0.36 | 0.39 | 0.36 | 0.38 | 0.52 | 0.38 |
| 2 | | 0.38 | 0.39 | 0.35 | 0.35 | 0.31 | 0.42 | 0.42 |
| 3 | 0.31 | 0.31 | 0.35 | 0.35 | 0.29 | 0.35 | 0.39 | 0.42 |
| 4 | | 0.30 | 0.28 | 0.34 | 0.30 | 0.31 | 0.34 | 0.39 |
| 5 | 0.35 | 0.29 | 0.29 | 0.30 | 0.31 | 0.30 | 0.34 | 0.38 |
| 6 | | 0.32 | 0.30 | 0.24 | 0.31 | 0.30 | 0.30 | 0.34 |
| 7 | 0.37 | 0.32 | 0.27 | 0.25 | 0.29 | 0.29 | 0.31 | 0.34 |
| 8 | | 0.35 | 0.28 | 0.27 | 0.23 | 0.30 | 0.29 | 0.31 |
| 9 | 0.36 | 0.32 | 0.29 | 0.25 | 0.25 | 0.30 | 0.29 | 0.39 |
| 10 | | 0.32 | 0.33 | 0.27 | 0.26 | 0.26 | 0.30 | 0.36 |

The proposed method, termed in silice, from the ablative of the Latin word for stone, silex, silicis, is based on u statistics. For each bin of width w, one first determines all possible $2^w$ pairs of a putative high risk and a corresponding low risk diplotype. For markers 77-121 (Table 6), for instance, g-a-c-t-t-g and the converse t-c-t-c-a-c are such a pair of putative diplotypes(see FIG. 4).

One then determines how likely the interval between two marker loci is to contain a disease gene under the assumption of co-dominance, i.e., if being homozygous for the high risk allele at a given locus confers a higher risk, although not necessarily a two-fold risk, than being heterozygous. In general, genetic evidence for a disease gene D to be located between markers L and R can only be partially ordered making this an ideal situation for the application for scores based on the ordinal model. For inbred strains, where all markers are homozygous, the partial ordering (FIG. 3b) reduces to a complete ordering (FIG. 3a), so that, without loss of generality, intervals can be scored 1.0, 0.5, and 0.0, respectively. However, even with inbred strains the information content among the different classes of observations differs. Only the observations within the top and bottom node, respectively, form exact ties.

In the earlier application 20030182281 a two-step approach had been proposed. In the first step, each marker interval would be scored. Then, u-statistics can again be used, this time to score the marker interval scores within the diplotypes with respect to the above putative extreme diplotypes, which serves as a reference to define the orientation of the pairwise orderings (see FIG. 4). For the reason mentioned above, namely that the order of the interval is exact for inbred animals, the instant approach, which operates hierarchically on the partial orderings themselves, rather than the scores, is equivalent to the approach of the earlier application 20030182281, thereby demonstrating the validity of the proposed approach.

FIG. 5 demonstrates how these techniques can be combined to correlated a diplotype to the observed phenotype. For computational simplicity, the alleles of the putative high and low risk diplotype are assigned the values '1' and '0', respectively.

Clearly, if the assignment of the alleles to the putative high and low risk diplotype, respectively, should be true, the highest lesion size strain (DBA) is the only strain having two intervals with high risk alleles at both ends, while the lowest atherosclerosis strain C3H is the only strain having none. On the other hand, intervals with low risk alleles at both ends are only found among the low lesion size strains AKR, BLB, and C3H.

Moving bins of various width across the genome, one marker at a time, scans the genome for areas of interest, i.e., where genes might be located that might have a causal relationship with the phenotype. One preferred implementation was realized in MS Excel using a worksheet, an excerpt of which is displayed in FIG. 5.

The results suggest the area between 30 and 50 cM as the most promising area for a gene associated with atherosclerosis (see Table 8). The results for the scan of the full chromosome 1 are given in FIGS. 6a and b.

Mining chromosome 1 for genetic factors associated with atherosclerosis indicates several candidate areas. Interestingly, the two statistical methods agree only on two of these areas, one below 10 cM and the other around 55 cM. Two other areas, around 85 and above 110 cM are suggested by the 'in silico' linear model method. The in silice ordinal model method indicates the same for areas when restricted to very narrow bins. When one allows for wider bins, the in silice method suggests three other areas, around 35 cM, around 75 cM, and between 90 and 100 cM.

TABLE 8

In silice correlation between phenotype and genotype scores (markers 2-121) for bins of 1-10 adjacent informative markers.

| Mrk # | 2 | 14 | 18 | 25 | 27 | 55 | 57 | 59 |
|---|---|---|---|---|---|---|---|---|
| DBA | t | c | t | g | g | g | c | t |
| C57 | c | t | c | t | g | g | t | t |
| 129 | c | t | t | t | g | g | c | c |
| AKR | c | t | t | t | t | c | c | t |
| BLB | c | t | t | g | g | g | t | c |
| C3H | c | t | t | t | g | g | c | t |
| 1 | 0.65 | 0.65 | 0.33 | 0.27 | 0.16 | 0.16 | 0.02 | 0.25 |
| 2 | | 0.65 | 0.77 | 0.50 | 0.28 | 0.16 | 0.10 | 0.22 | 0.39 |
| 3 | 0.65 | 0.80 | 0.66 | 040 | 0.28 | 0.13 | 0.16 | 0.38 |
| 4 | | 0.80 | 0.69 | 0.58 | 0.40 | 0.26 | 0.18 | 0.35 | 0.40 |
| 5 | 0.80 | 0.69 | 0.58 | 0.58 | 0.48 | 028 | 035 | 0.35 |
| 6 | | 0.69 | 0.58 | 0.58 | 0.63 | 0.55 | 0.62 | 0.35 | 0.35 |
| 7 | 0.69 | 0.58 | 0.58 | 0.63 | 0.66 | 0.62 | 0.75 | 0.35 |
| 8 | | 0.58 | 0.58 | 0.63 | 0.66 | 0.66 | 0.75 | 0.71 | 0.35 |
| 9 | 0.58 | 0.58 | 0.63 | 0.66 | 0.66 | 0.75 | 0.71 | 0.75 |
| 10 | | 0.58 | 0.63 | 0.66 | 0.66 | 0.75 | 0.71 | 0.75 | 0.75 |

| Mrk # | 74 | 77 | 84 | 86 | 107 | 108 | 121 |
|---|---|---|---|---|---|---|---|
| DBA | g | g | c | c | t | t | c |
| C57 | g | t | a | t | t | t | c |
| 129 | g | g | c | c | c | t | g |
| AKR | a | g | c | c | t | a | c |
| BLB | a | t | c | t | t | t | c |
| C3H | g | g | c | c | c | a | g |
| 1 | 0.36 | 0.02 | 0.33 | 0.02 | 0.41 | 0.52 | 0.41 |
| 2 | | 0.32 | 0.30 | 0.30 | 0.39 | 0.58 | 0.58 |
| 3 | 0.43 | 0.18 | 0.33 | 0.43 | 0.66 | 0.58 | 0.73 |
| 4 | | 0.36 | 0.36 | 0.58 | 0.79 | 0.74 | 0.73 |
| 5 | 0.36 | 0.36 | 0.76 | 0.79 | 0.83 | 0.73 | 0.73 |
| 6 | | 0.36 | 0.80 | 0.82 | 0.83 | 0.79 | 0.73 |
| 7 | 0.35 | 0.75 | 0.81 | 0.82 | 0.79 | 0.79 | 0.67 |
| 8 | | 0.75 | 0.79 | 0.83 | 0.82 | 0.79 | 0.75 |
| 9 | 0.75 | 0.79 | 0.83 | 0.81 | 0.82 | 0.75 | 0.75 |
| 10 | | 0.79 | 0.83 | 0.79 | 0.81 | 0.76 | 0.75 |

As demonstrated in the detailed analysis of FIG. 5, the area with the highest in silice evidence (−35 cM, #74-#121, r=0.83) clearly is of interest, because of the obvious potential for a straightforward biological interpretation. That the 'in silico' method, which is based on the linear model, is overlooking this evidence has two reasons.

First, the 'in silico' method is based on the linear model, i.e., on linear combinations of evidence across adjacent markers. Thus, if one sub-region has many known markers in the data base, this sub-region gets more weight than other sub-regions, even if it's relevance for atherosclerosis is low. In particular, the linear model is more likely to be affected by sub-regions not coding for proteins (introns). The above interesting area contains two markers (#77 and #86), where the univariate correlation is extremely low (r=0.02). Thus, the "in silico" method's lack of sensitivity can be explained by introns "diluting" the evidence of the markers #74, #36, and #107 where coding for proteins relevant to atherosclerotic risk may occur. The in silice method is less sensitive to dilution effects. Eliminating the 77-84 interval to the 77-121 range, for instance, would not change the correlation in FIG. 5, because the intervals 77-84 and 84-86 have the same interval scores.

The second reason for the in silice method to be superior to the 'in silico' method lies in the fact that only the former method accounts for the orientation of the phenotypic and genotypic differences. This can easily be seen by comparing the intervals 84-86 and 86-107. Clearly, both intervals together provide more evidence for an interaction between phenotype and genotype than each of the intervals alone, which is reflected in a higher ordinal correlation (0.43 vs. 0.30 and 0.39). With the "in silico" method, however, the linear correlation is lower (0.29 vs. 0.35 and 0.31).

Another advantage of the in silice method is, that it not restricted to binary data. Thus, the method can be extended in two ways. First, it can also be used for outbred species in general and humans in particular, because UStat interval scores can be computed in either case (FIG. 3) and because the next step, the computation of UStat haplotype scores, is not restricted to any specific scoring mechanism used for the interval scores.

In fact, the second (multivariate) scoring algorithm is not restricted to haplotypes, but can be applied to other data as well. In particular, one can replace the interval scores by micro-array expression levels. Thus the same algorithm and, in fact, the same program can be used to mine microarray data. If a biological hypothesis suggests that specific genes should be involved, the multivariate scoring mechanism generates pathway scores from gene expression data, instead of haplotype scores from interval u scores. If a more general question is asked, it generates epistatic interaction scores that allow to generate hypothesis about pathways through multi-variate screening of microarray data.

EXAMPLE 3

Immune and Clinical Responses After Vaccination of Patients with Metastatic Melanoma with $CD34^+$ Hematopoietic Progenitor-derived Dendritic Cells Molecular identification of human cancer antigens in the last decade has led to a new era of antigen specific cancer immunotherapy specifically targeting these antigens. However, several such approaches (e.g., peptides, DNA vaccines and viral vectors) had thus far little or no success in the clinic. In particular, it has proven difficult to immunize humans simultaneously with multiple tumor antigens. In the case of melanoma, the immune system may be tolerized to these 'self' antigens, because they are also expressed on normal tissues (e.g., melanocytes). Additional obstacles may include, but are not limited to, tumor-induced tolerance and global immunosuppression in advanced cancer. Unfortunately, most human tumor vaccine studies have not included control $CD8^+$ T cell antigens (e.g., viral $CD8^+$ epitopes), making it difficult to distinguish between these possibilities.

Dendritic cells (DCs) are antigen-presenting cells specialized to initiate and regulate immune responses. Their clinical use as adjuvants has been aided by the development of methodologies to generate large numbers of these cells in culture from blood monocytes or $CD34^+$ progenitors. In contrast to monocyte derived DCs, DCs derived from $CD34^+$ cells consist of two phenotypically and functionally distinct populations. One subset is similar to the epidermal Langerhans cells (LCs), while the other termed 'interstitial/dermal DCs' is similar to those derived from blood monocytes. Immune responses to these unique LC containing preparations need to be evaluated in humans. Here we describe the safety and immunogenicity of antigen bearing $CD34^+$ derived DCs (CD34-DCs) in patients with stage IV melanoma.

Eighteeen HLA-A201$^+$ patients with metastatic melanoma were injected with CD34-DCs. All patients gave a written informed consent and the study was approved by the Food and Drug Administration, the National Cancer Institute and the Institutional Review Board. Patients received a 6-week out-patient vaccination course with antigen-loaded CD34-DCs given subcutaneously (s.c.) every 14 days for a total of four vaccinations. DCs were administered in a dose escalation design at the dose level per cohort of 0.1, 0.25, 0.5, and $1 \times 10^6$ DC/kg/injection.

Two essays were performed, termed 'direct' and 'recall'. Direct ELISPOT assay was performed for the detection of antigen specific IFN-γ producing T cells. PBMCs were added to plates precoated with a primary anti-IFN-γ mab in the presence or absence of 10 μg/ml peptide antigens. The antigens were the same HLA A*0201 restricted peptides (4 melanoma peptides and Flu-MP) used in the DC vaccine. Antigen specific SFCs were calculated after subtracting the background with control peptide.

To evaluate the 'recall' ability of antigen specific T cells to proliferate and differentiate in culture, pre and post immunization PBMC were thawed together and co-cultured ($2 \times 10^5$ cells/well) for 7 days with autologous mature DCs pulsed with peptides. After 7 days, cells were transferred to an ELISPOT plate and cultured overnight with irradiated T2 cells with or without specific antigen. Antigen specific SFCs were calculated after subtracting the background with unpulsed T2 cells.

As the role of different melanoma antigens with regard to protective immunity is not known, we integrated post-vaccination responses to all 4 melanoma antigens, as measured by both direct and recall assays, into an immunity score using a non-parametric method based on the marginal likelihood approach.

To score n individuals according to their immune response profiles, one computes all rankings (permutations of numbers 1 . . . n) that are compatible with all pairwise orderings. An immune response is considered higher, if it is at least as high for each of the variables considered and higher for at least one variable. A patient's immunity score is the average of the corresponding ranks among the compatible rankings minus the expected score. All immunized patients were included in the analysis in an 'intent to treat' approach. One patient was non-evaluable for clinical outcome and, thus, excluded from the analysis.

To correlate immune response profiles with clinical outcomes, patients were categorized as responders and non-responders, based on clinical outcomes. Different subsets of immunological responses were then selected to compute immunological response scores based on the marginal likelihood principle.

For each of the 17 patients, clinical and immunological responses are listed in Table 2.

TABLE 9

Clinical and immunological responses after dendritic cell vaccination in patients with melanoma . . .

| | | MAGE | | | | MART | | | | Tyr | | | | gp100 | | | |
|---|---|---|---|---|---|---|---|---|---|---|---|---|---|---|---|---|---|
| | | direct | | recall | | direct | | recall | | direct | | recall | | direct | | recall | |
| ID | CR | abs | rel | abs | rel | abs | rel | abs | rel | abs | rel | abs | rel | abs | rel | abs | rel |
| 1 | 1 | 8.0 | 1.07 | 40.0 | 1.13 | 3.0 | 0.05 | 59.0 | 1.07 | 6.0 | 1.03 | 45.0 | 0.91 | 8.0 | 0.83 | 40.5 | 0.83 |
| 2 | 0 | 4.0 | 0.56 | 2.5 | −0.15 | 0.5 | −0.44 | 14.5 | 1.86 | 2.5 | 0.92 | 9.0 | 0.78 | 8.0 | 1.60 | 14.0 | 0.75 |
| 3 | 1 | 36.0 | 2.26 | ? | ? | 25.0 | 0.90 | ? | ? | 27.0 | 1.00 | ? | ? | 33.0 | 2.05 | ? | ? |
| 4 | 0 | 2.5 | 0.56 | 3.0 | 0.48 | 1.5 | 0.88 | ? | ? | 2.5 | 1.10 | 7.5 | 0.70 | 2.0 | 1.00 | 13.0 | 0.42 |
| 5 | 0 | 0.2 | 0.00 | 0.2 | 0.00 | 0.2 | −0.16 | 0.2 | 0.00 | 0.2 | −0.16 | 0.2 | 0.00 | 0.2 | 0.00 | 0.2 | 0.00 |
| 6 | 1 | 23.0 | 1.42 | 178.0 | 1.60 | 13.0 | 0.09 | 55.0 | 0.61 | 24.0 | 0.65 | 110.0 | 1.39 | 25.0 | 1.24 | 59.0 | 1.60 |
| 7 | 1 | 12.5 | 1.80 | 20.0 | 1.13 | 12.0 | 1.78 | 29.5 | 0.43 | 10.5 | 1.72 | 21.5 | 0.93 | 18.0 | 1.95 | 23.5 | 1.20 |
| 8 | 0 | 1.0 | −0.19 | 38.0 | 0.74 | 2.0 | 0.78 | 47.0 | 2.37 | 1.5 | 0.88 | 45.0 | 1.65 | 1.0 | 0.70 | 48.0 | 0.57 |
| 9 | 1 | 20.0 | 0.44 | ? | ? | 39.0 | 0.53 | ? | ? | 15.5 | 0.48 | ? | ? | 5.5 | 0.13 | ? | ? |
| 10 | 1 | 4.5 | 0.72 | 0.2 | 0.00 | 0.5 | −0.86 | 15.0 | 1.88 | 0.5 | −0.58 | 54.5 | 2.44 | 0.2 | −0.16 | 35.5 | 2.25 |
| 11 | 0 | 0.2 | 0.00 | 1.0 | −0.48 | 0.2 | −0.40 | 0.2 | −0.88 | 0.2 | −0.30 | 0.5 | −0.30 | 0.2 | 0.00 | 10.0 | 0.35 |
| 12 | 1 | 9.0 | 1.05 | 37.0 | 1.02 | 12.0 | 1.00 | 64.5 | 0.70 | 10.0 | 1.00 | 51.0 | 1.11 | 7.0 | 0.85 | 44.0 | 0.55 |
| 13 | 1 | 3.0 | 1.18 | 0.2 | 0.00 | 8.0 | 0.41 | 20.0 | 0.52 | 13.0 | 1.49 | 36.0 | 1.56 | 4.0 | 0.78 | 36.0 | 2.26 |
| 14 | 0 | 0.2 | −0.40 | 4.5 | 0.65 | 0.2 | −0.60 | 6.0 | 0.08 | 1.0 | 0.70 | 6.0 | 1.48 | 10.0 | 1.30 | 70.0 | 1.07 |
| 15 | 1 | 2.0 | 0.79 | 18.0 | 0.52 | 1.5 | 0.88 | 9.5 | −0.14 | 1.5 | 0.48 | 2.0 | 1.00 | 1.5 | 0.48 | 16.5 | 1.92 |
| 16 | 0 | 0.2 | 0.00 | 5.0 | −0.28 | 0.2 | −0.28 | 10.5 | −0.06 | 0.2 | −0.88 | 14.5 | 0.86 | 2.0 | 0.36 | 22.0 | 0.23 |
| 17 | 1 | 15.5 | 1.03 | 37.0 | 0.25 | 9.0 | 0.98 | 44.0 | 0.17 | 10.0 | 0.88 | 20.0 | −0.06 | 10.0 | 1.05 | 36.0 | 0.35 |

In earlier application 20030182281 non-hierarchical MrgL scores were computed through bootstrapping. Tumor immunity was lower among the 7 patients with progressive disease (p=0.043).

As was noted in the said application, the said approach is conservative, because of boot-strapping and because the hierarchy among the variables is ignored. A hierarchical approach at the level of the partial ordering provides for higher information content and, thus, more reliable results. For the data in Table 9, utilizing hierarchical information increases information content:

```
sum(mu.wght(IR, "(1,2,3,4,5,6,7,8,9,10,11,12,13,14,15,16)"))
  8.29
sum(mu.wght(IR, "( " %&%
  "(1,2),(3,4),(5,6),(7,8)," %&%
  "(9,10),(11,12),(13,14),(15,16))"))
  12.70
sum(mu.wght(IR, "(" %&%
  "((1,2),(3,4)),((5,6),(7,8))," %&%
  "((9,10),(11,12)),((13,14),(15,16))" %&% ")"))
  15.18
```

The gain in information content with the preferred method of operating hierarchically on partial orderings is higher than with the hierarchical scoring approach proposed in the earlier application 20030182281:

```
sum(mu.wght(cbind(
  mu.score(IR, "(1)"), . . ., mu.score(IR, "(16)"))))
  8.29
sum(mu.wght(cbind(
  mu.score(IR, "(1,2)" ), mu.score(IR,  "(3,4)" ),
  mu.score(IR, "(5,6)" ), mu.score(IR,  "(7,8)" ),
  mu.score(IR, "(9,10)"), mu.score(IR, "(11,12)"),
  mu.score(IR,"(13,14)"), mu.score(IR, "(15,16)"))))
  10.96
sum(mu.wght(cbind(
  mu.score(cbind(mu.score(IR, "(1,2)" ), mu.score(IR, "(3,4)" ))),
  mu.score(cbind(mu.score(IR, "(5,6)" ), mu.score(IR, "(7,8)" ))),
  mu.score(cbind(mu.score(IR, "(9,10)"), mu.score(IR,"(11,12)"))),
  mu.score(cbind(mu.score(IR,"(13,14)"), mu.score(IR,"(15,16)"))))))
  13.82
```

When faced with a plethora of outcomes (genetic, genomic, laboratory, . . . ), it is crucial to separate the wheat from the chaff, i.e., to determine the optimal combination of outcomes. Clearly, looking at these outcomes individually is not appropriate, because many clinically relevant features can only be identified by a combination of variables. The current statistical methods are based on the linear model, i.e., it is implicitly assumed that there is a linear relationship between the numerical value of the outcome and the clinical relevance, that the relative importance of the outcomes is constant across the whole range of the predicted variable (clinical response). U-scores overcome these obstacles. With this intrinsically valid approach available, it is now possible to reliably identify which assay outcomes, gene expressions, or SNP pattern are most relevant for differential diagnosis and then to use this optimal set of parameters to find the correct diagnosis for a patient.

EXAMPLE 4

Ranking Products During Online Shopping

With current Web search engines including, but not limited to, Froogle beta (www.froogle.com), beginning to provide decision support to consumers a consumer interested in buying, for instance, a computer can define restrictions ($1, 000.00-$3,000,00, 20-60 GB, 400-800 MB, etc.) and then select a criterion to sort the products (e.g., 'price'). FIG. 16 shows such a search strategy as displayed in a standard browser on a desktop or laptop computer. FIGS. 17a and b show a similar search on a smart phone.

While FIG. 16 suggests 'Sort by relevance' as the default option, albeit without an explanation as to how 'relevance' is determined, Google's pagerank™ algorithm, which scores relevance of Web pages recursively by the number of incoming links (http://www.google.com/corporate/tech.html), does not easily apply to scoring products with respect to consumer defined criteria. The current example demonstrates how u-scores for multivariate data can be used to score products by a consumer's multivariate 'preference' profile.

FIGS. 18a and b show a preferred user interface for the instant approach. By moving the focus to the on-screen field to be edited and pressing the Menu key, the user is given a series of choices including, but not limited to, the variable name (word, GHz, . . . ), the polarity ('=', '<', or '>'), and a value. The user can also reorder the fields and de- or promote variables to group or ungroup them, respectively.

The approach of the earlier application 20030182281 introduced a method to sort objects (products) comprehensively by several criteria, e.g., by key words, GHz, GB, MB, product rating, distance, and price. Thus, the variables GHz, GB, MB, product rating, and distance could now be interpreted as indicating preferences ('GHz >>', i.e., 'faster is better'), rather than restrictions ('GHz>1', i.e., 'any speed above 1 GHz suffices'). The preferred approach provides the consumer with an easy means to combine preferences and restrictions. The input 'GHz>>0.5' provides for 500 MHz as a cut off but also indicates that for all products (at or) above this cut off processor speed should be considered as one of the ordinal variables contributing to the partial ordering.

Moving from binary restriction criteria to graded preferences, clearly, has dramatic advantages in terms of utility. For the hypothetical data shown in FIG. 19, the restrictions defined in FIG. 18a (ignoring product rating and distance) are fulfilled for only a single computer, so that the customer could not consider price as a criterium for choosing among similar products.

Thus, a computer with a lot of memory and a large (and fast) hard drive at an attractive price would be dismissed merely because the processor speed is 'only' 900 MHz, rather than the arbitrary limit of 1 GHz. Adding a partial ordering as proposed in the earlier application 20030182281 (FIG. 18b) to cut-offs has two important advantages. First, several variables contributes to the partial ordering, so that objects with a preferable outcome are sorted into a position of higher relevance. Second, and for the same reason, the cutoff can be lowered, because for subjects in the lower range for this variable to be ranked high with respect to relevance, many other variables need to be exceptionally high. Thus, the introduction of a partial ordering increases the sensitivity of the decision support (relevant objects are not excluded merely because they are less favorable in a single outcome), but it also increases specificity (among the selected objects, the most favorable are ranked first). From FIG. 19, three systems are scored as similarly high in terms of overall 'power' (9-12, identified as 'Mix' in column 'Opt'). Of note, the highly specialized top three systems in either of the three categories rank low (−2-2) with respect to overall 'power'.

With the inclusion of additional criteria, however, the number of ambiguous pairwise orders increases. From FIG. 19, the combination (GHz, GB, MB) results in only 98 non-ambiguous pairwise orders. Adding a preference for a touch-screen (T, GHz, GB, MB) reduces the number of non-ambiguous orders to 74 (FIG. 20)

The preferred approach allows to reduce ambiguity by defining a hierarchy among the variables. Assuming that key-words, technical characteristics, and ratings can be grouped, a consumer might define a search strategy (in the language of Example 3) as {[(notebook OR tablet), (+GHz, +GB, +MB)], +product.rating}, −distance, −price The preferred method allows the knowledge about the variables' hierarchy to be utilized to increase information content and, thus, to increase the usefulness for the consumer of the results generated by the preferred method FIGS. 18b and c illustrate a user interface for the preferred method that is easily developed using software tools readily available, is based on the widely accepted paradigm of structuring information as 'trees' (with the individual preferences as 'leaves'), and can be run by a consumer even on a PDA, hand-held, or smartphone.

FIG. 21 shows how the hierarchical grouping (T,(GHz, GB, MB)) increases information content by increasing the number of non-ambiguous pairwise orders to 297, thereby providing the customer with more useful results to decide which computer to buy. Compared to the recommendations based non-hierarchical approach of the earlier application 20030182281 (FIG. 20), the non-tablet PCs are now clearly ruled out, while a larger set of products is now correctly seen as essentially equivalent (scores 15-25, indicated as 'TMix').

Hierachical scoring also has advantages about hierachical partitioning (or restricting). As can be seen from the lower left and the upper right quadrant of the square matrix of pairwise orders in FIG. 21, comparisons between tablet and non-tablet notebooks contribute to the scores and, thus, the preferred decision strategy based on hierarchical u-scores provides more useful information than methods based on hierarchical partitioning. If the system had first selected tablet computers and then scored only within the restricted set of tablet computers, the results would have been identical to those shown in FIG. 20, with little discriminating power below the top two and the bottom three in the tablet PC category.

Clearly, the hierarchical u-scores are are providing useful information. The majority of these computers is at least 1.0 GHz fast, has at least 60 GB disk space, and at least 750 MB memory. The two computers <1.0 GHz have a lot (1500 MB, the highest in tablet PCs) memory, the 60 GB systems have 1,4 GHz speed (the highest among tablet PCs) or at least 1000 MB. None of the other tablet PCs is better by pairwise order. Thus, among the tablet PCs, these nine systems are the most powerful. As the hierarchical u-scores provide the customer with nine computers to choose from, the user has sufficiently many alternatives to consider yet another feature, e.g., price.

If the consumer had defined the set of restrictions (T, GHz ≧0.8, GB ≧60, MB ≧750), the set of computers would also have included the inferior systems marked as 'x' in the first column of FIG. 21. On the other hand, any more restrictive set would have excluded some of these nine systems with optimal power balance. Thus, hierarchical u-scores have a better ROC (balance between sensitivity and specificity) than any set of multidimensional restrictions.

EXAMPLE 5

Scoring Hierarchically Grouped Variables Applied to Scoring Response to Treatment by Assessing Changes in Several Outcomes Changes in a single variable, e.g., expression of a single gene, are traditionally assessed by either differences or ratios (differences of the logarithms). The rationale underlying taking logarithms is that a change of the same magnitude is often believed to be more relevant when seen at lower than at a higher level.

When assessing the effect of a treatment on a complex disease, scoring changes in a single variable is rarely sufficient. Here, we consider changes in two parameters, which are termed A and B to ensure confidentiality of the unpublished results.

The above verbal description clearly yields a partial ordering of changes so that u-statistics can be used in situations where one is not sure whether logarithms or, for instance, the square root better account for the relevance of the same difference at various levels. After a simple transformation, the partial ordering for differences is obtained using the generic partial ordering: One defines the first variable as the difference and the second variable as any (anti-) monotone function of the minimum of the two observations.

The results for the outcomes A and B are shown in FIG. 11 and FIG. 12; respectively. As often the case, neither of the univariate analyses yields a result significant at the conventional 5% level. Here, the p-values are 16% and 9%. With the well-known Bonferroni correction for the two outcomes being analyzed, the p-values would be 32% and 19%, respectively. Analyzing the same data using hierarchical u-scores yields a p-value of 2.85% and avoids the need to adjust for multiplicity (FIG. 10).

When treating the two pairs of derived variables as four separate outcomes, only those pairs of subjects contribute (FIG. 13) where the order of the subjects is the same for outcome A (FIG. 11) and outcome B (FIG. 12). If there are many pairs of subjects ambiguously ordered with respect to changes in either outcome A or B. Thus, from FIG. 13 it is not sufficient to treat the four derived variables as separate variables, as many more pairwise orderings are ambiguous than in the preferred FIG. 10. The same is true for rescoring the scores obtained in FIG. 11 and FIG. 12, as shown in FIG. 14, as composed to the preferred approach, where the square matices are combined.

S/R LIBRARY FOR HIERARCHICAL MULTIVARIATE U SCORES

```
"%&%"     <- function(x,y) paste(x,y,sep="")
NAtoZer   <- function(x) { x[is.na(x)] <- 0; x }
sq.matrix <- function(x) matrix(c(x), sqrt(length(x)))
sq.array  <- function(x) array(x <- as.matrix(x),
              c(n <- sqrt(nrow(x)), n, ncol(x)))
mu.GE <- function(x, y=x) {
  if (!is.matrix(x)) x <- as.matrix(x)
  if (!is.matrix(y)) y <- as.matrix(y)
  ifelse1 (length(y)>1,
    apply(rbind(x,y),2,mu.GE,nrow(x)),
    as.numeric(NAtoZer(outer(x[1:y],x[31 (1:y)], ">="))))
}
mu.AND <- function(GE, frml = NULL) {
  if (is.null(frml)) {
    GE <- sq.array(GE)
    AND <- GE[,,1]$$0
    nNA <- AND[,1]*0
    for (i in 1:dim(GE)[3]) {
      nNA <- nNA + diag(GEi <- GE[,,i])
      AND <- AND * (GEi + (1-GEi)*(1-t(GEi))) }
      return(as.numeric(AND * ( c(nNA) %o% c(nNA) > 0 ))) }
  tkn <- unlists(strsplit(frml,""))
  nok <- attr(regexpr("[0-9, ( )]+",frml),"match.length")
  tmp <- matrix(0, dim(GE)[1]+1, sum(tkn=="(")+1 )
  FstFree <- function(tmp) match(TRUE, tmp[1,]==0, nomatch=0)
  lvl <- i <- 0
  while ((i <- i+1) <= nok) { switch( tkn[i], "," = next,
    "(" = lvl <- lvl + 1,
    ")" = { tmp[1, use <- (tmp[1,]==lvl)]<- 0 # flag for reuse
```

S/R LIBRARY FOR HIERARCHICAL MULTIVARIATE U SCORES -continued

```
      tmp[, FstFree(tmp)]<- c(lvl <- lvl - 1,mu.AND(tmp[-1,
      use]))},
    "" = { num <- as.numeric(substring(
      frml, i, i <- i-1+regexpr("[,)]", substring(frml,i+1)) ))
      if ((FstTmp <- FstFree(tmp)) == 0)
        FstTmp <- ncol(tmp <- cbind(tmp, 0))
      tmp[,FstTmp] <- c(lvl, GE[, num]) } ) }
  tmp[-1,1]
}
mu.Sums <- function(GE) {
  ICW <- function(GE) {
    wgt <- colSums(Ge|t(GE))     # 0: orig NA, 1: like NA, >1: no NA
    sqrt(wgt*(wgt>1)/nrow(GE)) }
  wght <- ICW(GE <- sq.matrix(GE))
  return(list (
    score = ( rowSums(GE) - colSums(GE) ) * ifelse(wght==),NA,1),
    wght = wght ))
}
mu.wScr   <- function(x, frml=NULL) mu.Sums(mu.AND(mu.GE(x),
            frml))
mu.score  <- function (...) mu.wScr(...)$score
mu.wght   <- function (...) mu.wScr(...)$wght
```

What is claimed is:

1. An intrinsically valid statistical approach for the analysis of inexact ordinal data having one or more variables and provision of numerical, textual, or graphical results for action by a decision maker, the approach comprising the steps of using a computer system for executing computer software and the computer system storing a computer readable medium to execute the computer software to perform the following steps:

(a) partially ordering data by determining for all pairs of data the order of a first datum compared to a second datum as (i) superior, (ii) inferior, (iii) equal, or (iv) undecided, wherein for tuples a partial ordering comprises the first datum to be superior if for each variable the first datum is superior or equal, and for at least one variable, the first datum is superior;

(b) factorizing the partially ordered data;

(c) generating a representation of pairwise orderings for each variable;

(d) recursively combining the representations of pairwise orderings for subsets of variables into a representation of the combined pairwise ordering, the subsets and combining functions based on knowledge about hierarchical relationships between subsets of the variables;

(e) generating a score for each datum based on the combined representation of pairwise orderings;

(f) estimating an information content for each of the scores;

(g) generating a weight for each score based on the information content;

(h) aggregating the scores and weights of all data using at least one statistical method for weighted rank scores, wherein the statistical methods are selected from the group comprised of ranking, positioning, comparing, discriminating/regressing, and clustering; and (i) outputting at least one of numerical, textual, and graphical results from the aggregating step (b) for display and review by the decision maker to enable action to be taken by the decision maker as a consequence of the results.

2. A process based on an intrinsically valid statistical approach wherein a decision maker obtains an ordered list of categories to which an entity may be assigned by utilizing a database of reference data sets of known categories and a potentially large set of variables, the process comprising the steps of using a computer system for executing computer software and the computer system storing a computer readable medium to execute the computer software to perform the following steps:
- (a) restricting a database of reference entities of known categories to an ad-hoc database based on a first subset of variables, termed characteristics;
- (b) selecting a set of control categories based on a second subset of variables, termed control indicators;
- (c) selecting a set of case categories based on a third subset of variables, termed case indicators;
- (d) selecting a reference population subset for each of the case categories and one reference population for a union of the control categories;
- (e) selecting a set of variables, termed discriminators, specific to a selected case category and the entity's characteristics subset, wherein the entity is positioned with respect to the joint case population and control population;
- (f) determining the entity's score relative to the control population, termed specificity, and the subject's score relative to the case population, termed sensitivity;
- (g) ordering the categories by utilizing information from all obtained relative positions and consequences of assuming the entity to belong to a particular category; and
- (h) outputting results from step (g) for display and review by the decision maker to enable action as a consequence of the results.

3. The process of claim 2, whereby a decision maker iteratively interacts with the database of reference data and the potentially large set of variables, further comprising the steps of using a computer system for executing computer software and the computer system storing a computer readable medium to execute the computer software to perform the following steps:
- (a) modifying and structuring the characteristics by which the ad-hoc database is selected;
- (b) modifying and structuring the categories, and the indicators by which the categories are defined;
- (c) modifying and structuring the indicators by which the categories are defined and modifying the categories; and
- (d) modifying and structuring the discriminators by which the position of the subject relative to the reference populations is determined.

4. The process of claim 2, whereby the decision maker determines the ad-hoc database, and the steps further comprising using a computer system for executing computer software and the computer system storing a computer readable medium to execute the computer software to perform the following steps:
- (a) choosing characteristics and structuring to be added by selecting from a list of characteristics; and
- (b) choosing characteristics and structuring to be added from a list of ordered variables.

5. The process of claim 2, comprising determining the categories to be considered interactively, the steps further comprising using a computer system for executing computer software and the computer system storing a computer readable medium to execute the computer software to perform the following steps:
- (a) choosing categories to be added by selecting from a list of categories; and
- (b) selecting a list of indicators and then choosing categories from an ordered list of categories to which a subject can be assigned by utilizing a database of reference subjects of known categories and a potentially large set of variables.

6. The process of claim 2, further comprising interactively modifying the discriminators to be considered, the steps further comprising using a computer system for executing computer software and the computer system storing a computer readable medium to execute the computer software to perform the following steps:
- (a) choosing discriminators to be added by selecting from al list of discriminators;
- (b) choosing discriminator variables from a list of variables ordered by their specificity from a database of reference subjects of known categories and a potentially large set of variables.

7. The process of claim 2, further comprising modifying the final ordering of the categories by assigning a list assessment set of variables to each category, the list comprising:
- (a) type-I/type-II error rate ratio;
- (b) cost/benefit ratio of a type-I decision; and
- (c) cost/benefit ratio of a type-II decision.

8. The process of claim 2, providing a method for an assisted medical diagnosis of a patient.

9. The process of claim 8, providing a method for assisted medical diagnosis of a patient that is automated.

10. The process of claim 8, further including the step of performing an interactive assisted medical diagnosis.

11. The process of claim 2, providing a method for searching an information repository wherein the entity is one of a plurality which are sorted in an order ranging from a highest to a lowest relevance score.

12. The process of claim 2, providing a method for associating features with a document.

13. The process of claim 12, wherein the document is a Web page.

* * * * *